United States Patent [19]
Satoh et al.

[11] Patent Number: 5,903,531
[45] Date of Patent: May 11, 1999

[54] REPRODUCTION DEVICE FOR OPTICAL DISKS

[75] Inventors: Hiroharu Satoh, Tokyo; Hisashi Yamada, Yokohama; Junichi Uota, Tokyo, all of Japan

[73] Assignee: Kabushiki Kaisha Toshiba, Kawasaki, Japan

[21] Appl. No.: 08/800,000

[22] Filed: Feb. 13, 1997

[30] Foreign Application Priority Data

Feb. 13, 1996 [JP] Japan .................................. 8-025612

[51] Int. Cl.[6] ....................................................... G11B 7/00
[52] U.S. Cl. ........................... 369/44.29; 369/54; 369/58; 369/94
[58] Field of Search ............................. 369/44.27, 44.23, 369/44.25, 44.37, 110, 100, 94, 44.29, 54, 58

[56] References Cited

U.S. PATENT DOCUMENTS

| | | |
|---|---|---|
| 5,263,011 | 11/1993 | Maeda et al. . |
| 5,289,443 | 2/1994 | Maeda et al. . |
| 5,446,565 | 8/1995 | Komma et al. ...................... 369/44.23 |
| 5,671,203 | 9/1997 | Ra ........................................ 369/44.27 |
| 5,706,269 | 1/1998 | Ogura et al. ............................... 369/94 |
| 5,721,723 | 2/1998 | Uchimaru et al. ................... 369/44.15 |

FOREIGN PATENT DOCUMENTS

| | | |
|---|---|---|
| 470807 | 2/1992 | European Pat. Off. . |
| 517490 | 12/1992 | European Pat. Off. . |
| 520619 | 12/1992 | European Pat. Off. . |
| 720159 | 7/1996 | European Pat. Off. . |
| 727776 | 8/1996 | European Pat. Off. . |
| 734457 | 9/1996 | European Pat. Off. . |
| 742554 | 11/1996 | European Pat. Off. . |
| 758126 | 2/1997 | European Pat. Off. . |
| 762398 | 3/1997 | European Pat. Off. . |
| 43 30 794 | 3/1994 | Germany . |
| 196 07 169 | 11/1996 | Germany . |
| 8- 293153 | 11/1996 | Japan . |
| 96/19807 | 6/1996 | WIPO . |
| 97/09716 | 3/1997 | WIPO . |

*Primary Examiner*—Thang V. Tran
*Attorney, Agent, or Firm*—Pillsbury Madison & Sutro LLP

[57] ABSTRACT

Signal processing systems can be switched according to the optical system selected from a plurality of optical systems and set to the operating state. A system controlling portion 100 finally sets an appropriate optical system according to the kind of an optical disk 11, and sets an appropriate signal processing system corresponding to the set optical system for setting an appropriate mode depending upon CD (compact disk) or DVD (high density recording disk).

10 Claims, 21 Drawing Sheets

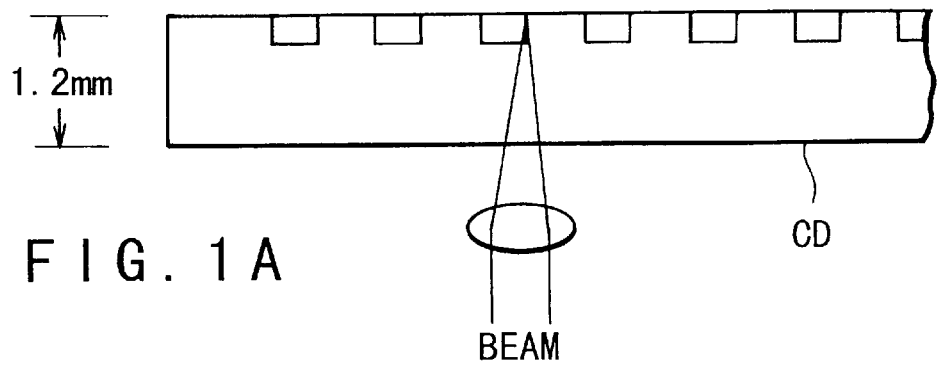
F I G. 1A
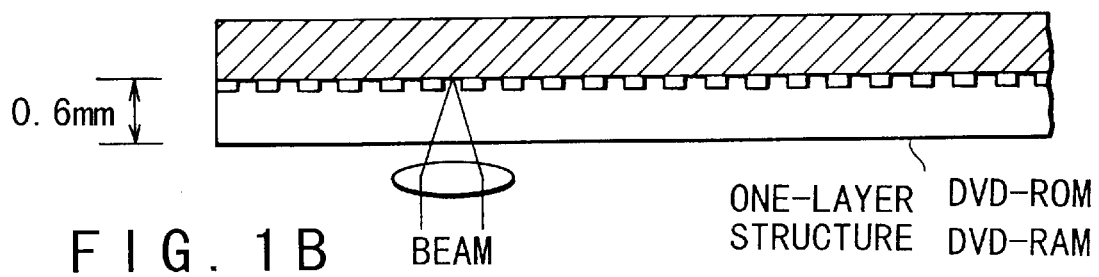
F I G. 1B
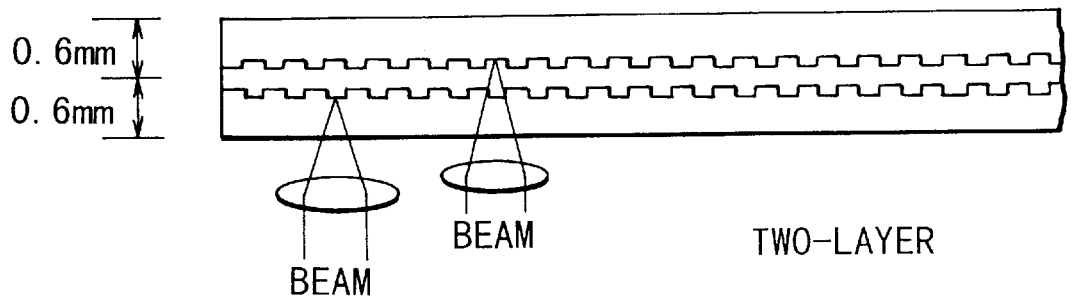
F I G. 1C

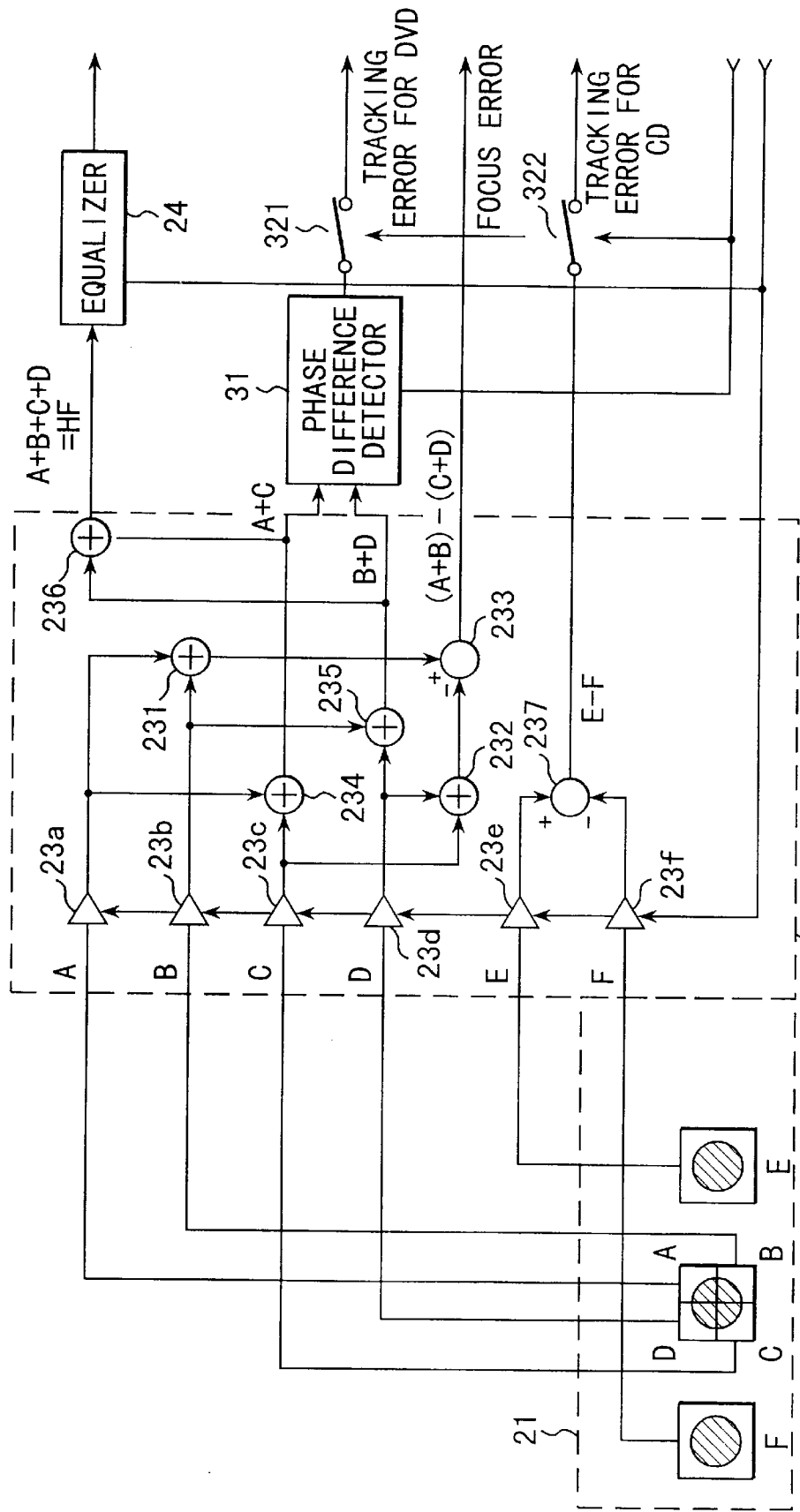
F I G. 5

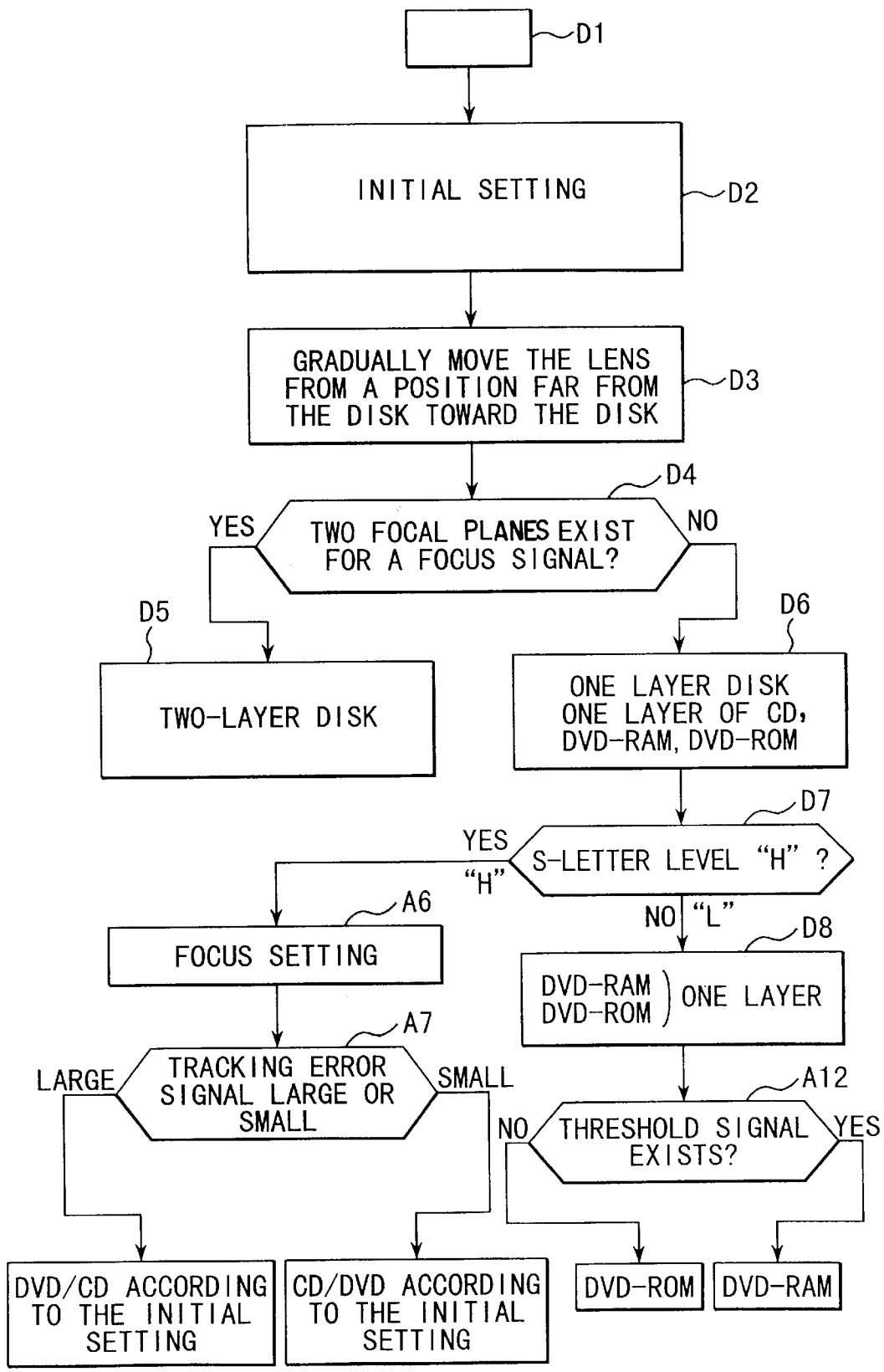
F I G. 10

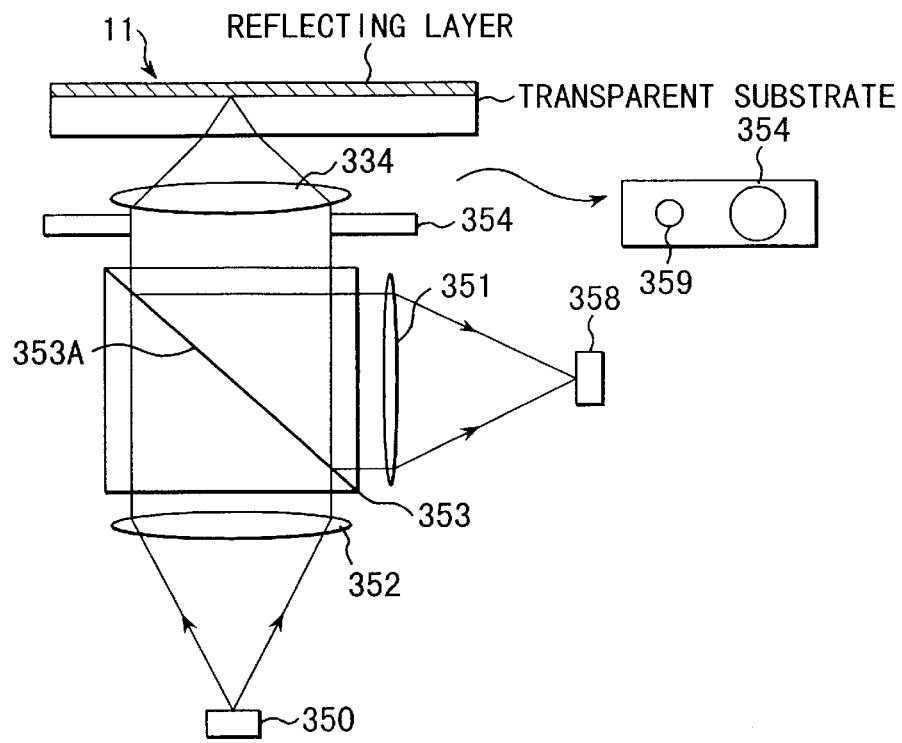
F I G. 16
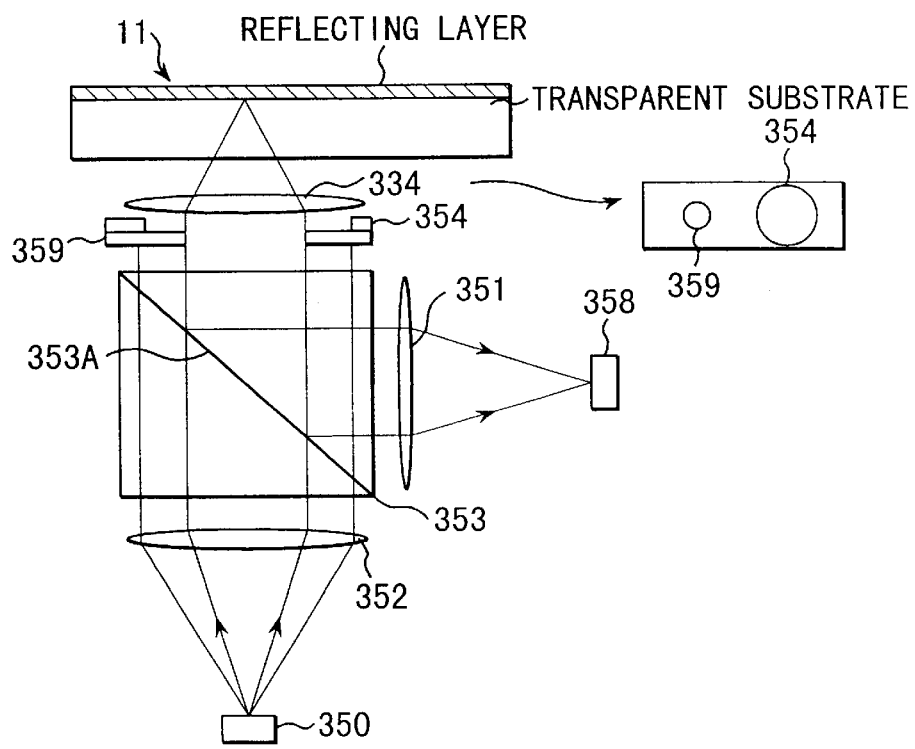
F I G. 17

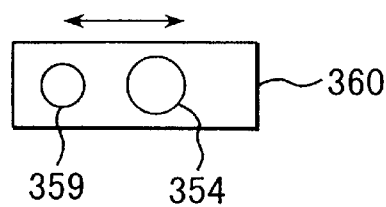
F I G. 18A
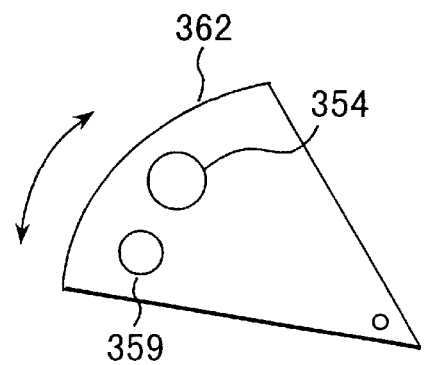
F I G. 18B
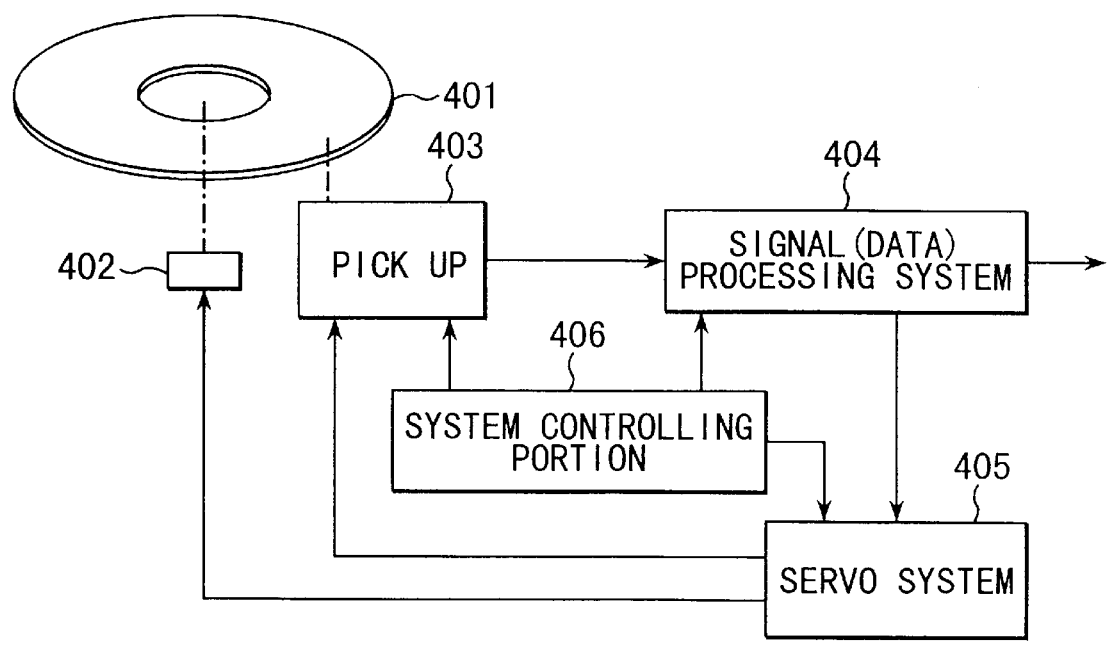
F I G. 19

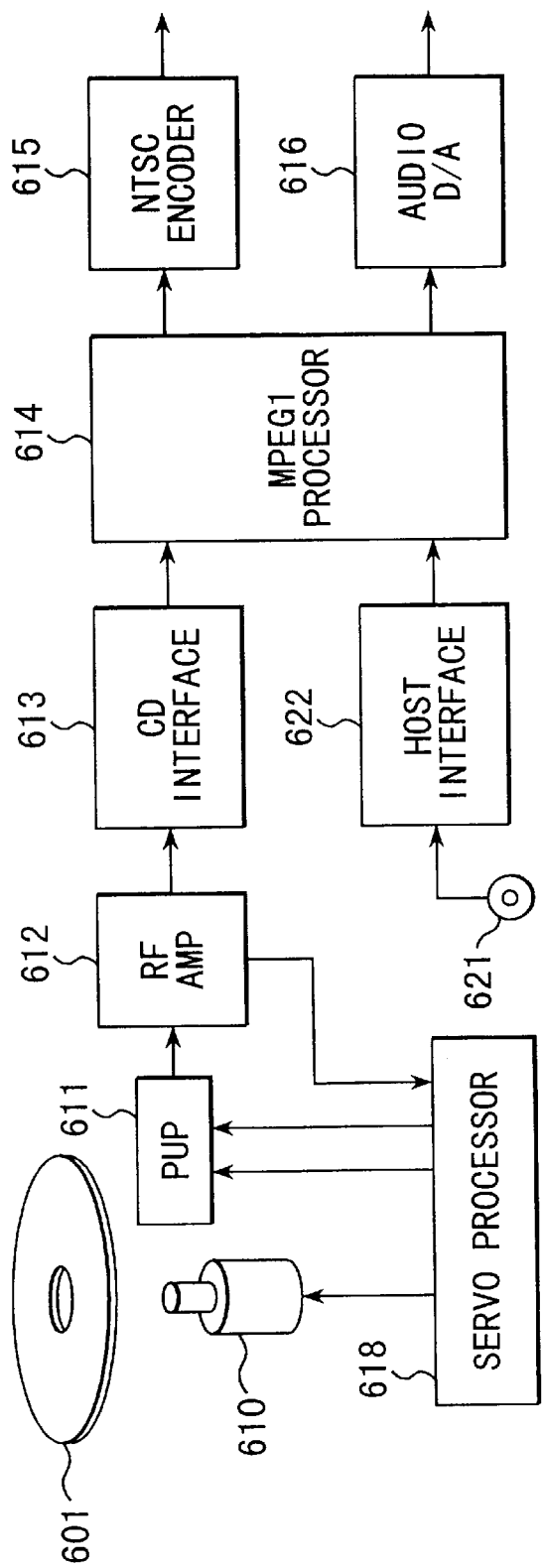
F I G. 24A
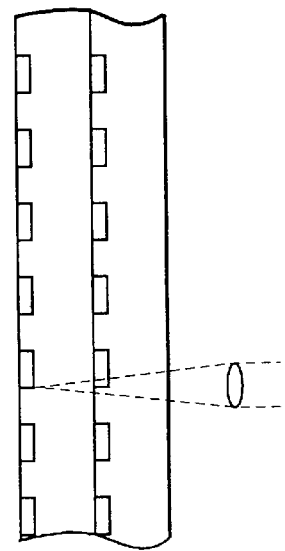
F I G. 24B

REPRODUCTION DEVICE FOR OPTICAL DISKS

BACKGROUND OF THE INVENTION

This invention relates to a reproduction device for optical disks, and more specifically, to a device for conducting appropriate reproduction and recording according to the kind of optical disk by relating a plurality of optical systems having different beam spot sizes or different wavelengths and a signal processing system having a plurality of signal processing characteristics corresponding to the above-mentioned plurality of optical systems.

Conventional reproduction devices of optical disks for music allow switching of the moving range of a pick-up device according to the size of the optical disk (having a diameter of 12 cm, 8 cm and the like). However, such reproduction devices require as a premise that the recorded signal system be standardized. Therefore, the disk corresponding functions can be designed based on only the size of the optical disk.

However, since various kinds of optical disks have been developed, optical disks having different signal recording systems and standards exist. Although reproduction devices corresponding to each optical disk have been developed, it is inconvenient for users.

As mentioned above, various kinds of optical disks having different signal recording systems and standards now exist. Therefore, a device for recording and reproducing corresponding to various kinds of optical disks is being required.

BRIEF SUMMARY OF THE INVENTION

Accordingly an object of the invention is to provide a reproduction device for optical disks capable of providing appropriate signal processing by switching the signal processing side characteristics of a read-out signal according to switching of the characteristics of the optical system.

Another object of the invention is to provide a reproduction device for optical disks comprising a plurality of optical systems and a signal processing system having a plurality of signal processing characteristics corresponding to the above-mentioned plurality of the optical systems for conducting appropriate reproduction and recording. This is accomplished according to the kind of an optical disk by corresponding one of the optical systems and one of the signal processing characteristics.

Still another object of the invention is to provide a reproduction device for optical disks capable of distinguishing different kinds of optical disks precisely.

The invention relates to a reproduction device for optical disks to reproduce signals recorded on a plurality of disks via an optical pick-up, comprising a numerical aperture changing means to change the numerical aperture of a beam outputted from the above-mentioned optical pick-up according to the disk to be reproduced and a signal processing system changing means to change the characteristics of a signal processing system connected to the later stage of the above-mentioned pick-up subsequent to the change of the numerical aperture of the beam by the above-mentioned numerical aperture changing means according to the disk to be reproduced.

Furthermore, the invention comprises a plurality of optical systems having different pick-up characteristics and a means to construct a signal processing system corresponding to one selected from the plurality of the optical systems by collecting the selected signal.

According to such means, a signal reproduction route appropriate for each type of optical disk or the type of the signal recorded in the disk can be constructed.

Furthermore, the above-mentioned plurality of optical systems of the invention are optical systems having different beam spot sizes or different wavelengths.

Moreover, in the above-mentioned optical systems, a three-beam system and an one-beam system can be switched so as to switch the three-beam system used in reproducing a disk with a first size pit and the one-beam system used in reproducing a disk with a second size pit, which is smaller than the first size pit.

An optical pick-up device of the invention comprises a plurality of optical systems having different beam spot sizes or wavelengths, a switching means facing an optical disk mounted with one of the above-mentioned plurality of optical systems, a detecting means to detect a reflected light of a beam irradiated to the optical disk, a focus adjusting mechanism for the optical disk, and a tracking adjusting mechanism for the optical disk. Further, the signal processing portion capable of switching the processing characteristics according to the kind of the optical disk reproduces the signal recorded in the optical disk utilizing the signal detected with the detecting means. Herein a focus servo means capable of switching the servo characteristics according to the kind of the optical disk generates a focus error signal utilizing the signal detected with the detecting means for feeding back to the focus adjusting mechanism. Further, a tracking servo means capable of switching the servo characteristics according to the kind of optical disk generates a tracking error signal utilizing the signal detected with the detecting means for feeding back to the tracking adjusting mechanism. A system controlling means comprises an optical system setting means to allow the switching means to select an optional optical system suitable for an optional optical disk as the optical system to be used, a system setting means to switch the signal processing portion, focus servo means and tracking servo means to have processing characteristics and servo characteristics corresponding to the optional optical disk, and the distinguishing means of the kind of the optical disk.

According to the above mentioned means, suitable optical systems or reproduction processing characteristics can be set for reading out the recorded signals according to various kinds of optical disks.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute part of the specification, illustrate presently preferred embodiments of the invention, and together with the general description given above and the detailed description of the preferred embodiments given below, serve to explain the principles of the invention.

FIGS. 1A, 1B and 1C are cross-sectional views illustrating the principles of different kinds of optical disks.

FIG. 5 is a chart illustrating the inside of the light detecting portion and the preamplifier of a light pick-up device in detail.

FIG. 10 is a flow chart illustrating still another example of the disk distinguishing processing of the invention.

FIG. 16 is a diagram illustrating an embodiment of an optical system of a reproduction device of the invention.

FIG. 17 is a diagram illustrating an embodiment of an optical system of a reproduction device of the invention.

FIGS. 18A and 18B are diagrams illustrating an embodiment of an optical system switching means of a reproduction device of the invention.

FIG. 19 is a chart illustrating an example of an entire block constitution of a reproduction device of the invention.

FIG. 24A is a chart illustrating a block constitution of a CD player.

FIG. 24B is a cross-section view illustrating the principle of the disk shown in FIG. 24A.

DETAILED DESCRIPTION OF THE INVENTION

Preferred Embodiments

Hereinafter embodiments of the invention will be explained with reference to the drawings.

Structures of existing optical disks will be described. FIGS. 1A–1D include cross-sectional views illustrating principles of different kinds of optical disks FIG. 1A shows a conventional compact disk (so-called CD) for music use, having a thickness of 1.2 mm by regulation. FIG. 1B shows an optical disk wherein a high density recording is achieved with image codes and audio codes processed with data compression, including a super high density optical digital video disk capable of recording and reproduction (hereinafter abbreviated as DVD). Therefore, DVDs include DVD-ROMs only for reproduction and DVD-RAMs also capable of recording. FIG. 1B shows a DVD having a one-layer structure in the reading and recording surface, whereas FIG. 1C shows a DVD-ROM having a two-layer structure with two pieces attached. Either type of disks must have a 1.2 mm entire thickness and a 0.6 mm substrate thickness by regulation. Besides, both CDs and DVDs must have a diameter of 12 cm and 8 cm respectively.

Figure 2A:
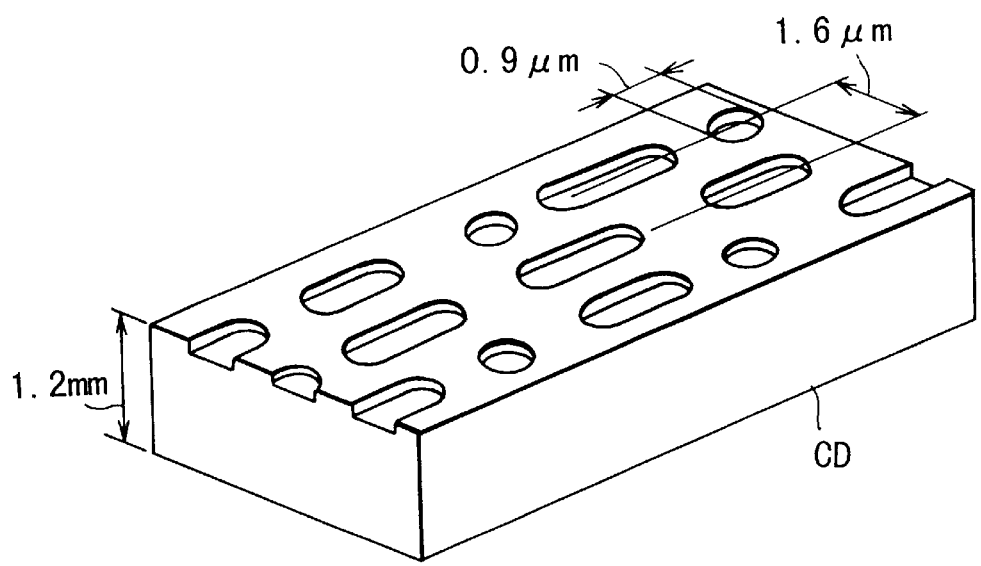
FIGS. 2A, 2B and 2C are enlarged views of the back side of the recording surface of different kinds of optical disks.
Figure 2B:
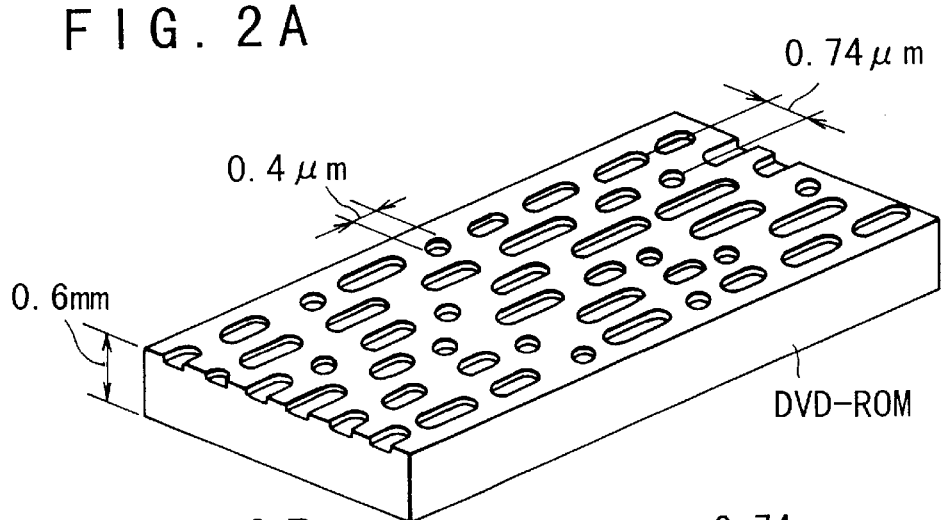
Figure 2C:
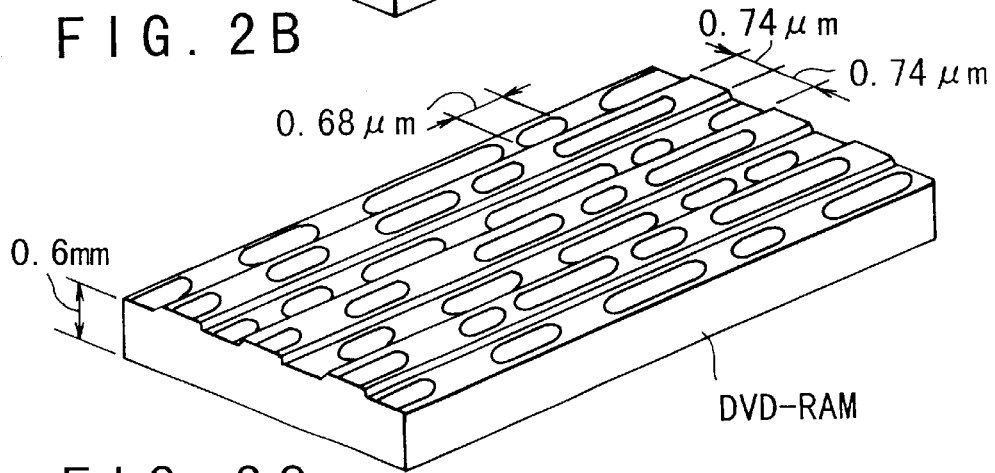

FIGS. 2A–2C include enlarged recording surfaces of the above-mentioned optical disks shown from the back side.

FIG. 2A shows a structure of the recording surface of a CD. FIG. 2B shows a structure of the recording surface of a DVD-ROM. FIG. 2C shows a structure of the recording surface of a DVD-RAM. The disk substrate thickness, pit width and track width are also shown in these Figures.

As mentioned above, optical disks have different track pitches or different recording formats.

Figure 3:
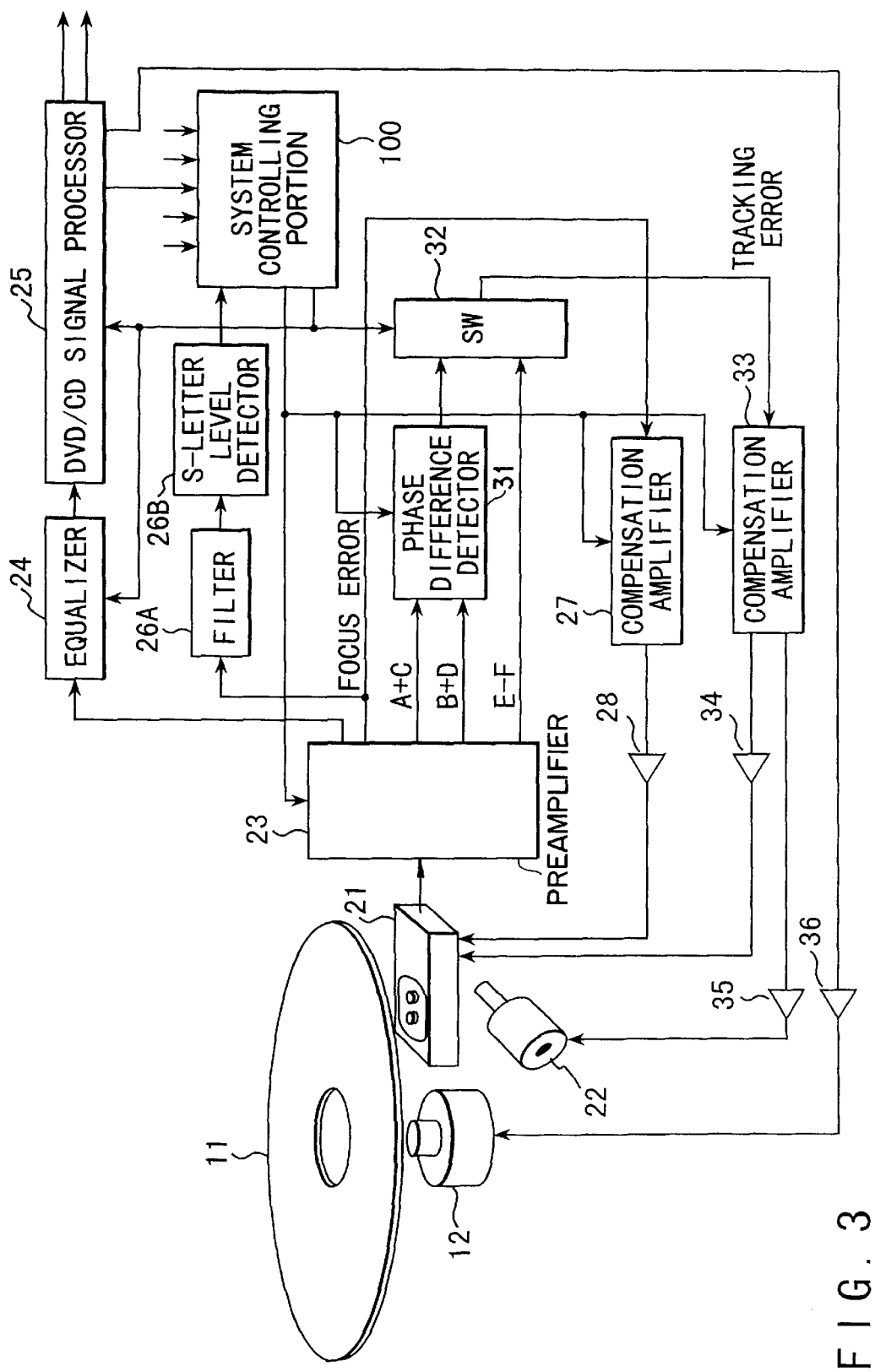
FIG. 3 is a chart illustrating an embodiment of a reproduction device of the invention.

FIG. 3 illustrates a reproduction device utilizing the invention.

An optical disk 11 is rotated by a disk motor 12. A light pick-up device 21 is controlled and moved with respect to the radial direction of the disk with a feed motor 22. The light pick-up device 21 comprises optical systems of which the numerical aperture of a beam can be changed so as to irradiate both a beam for CD and a beam for DVD. Therefore, the optical systems for the light pick-up device 21 can be switched according to the optical disk to be reproduced or recorded.

The reason for switching optical systems is that since CDs and DVDs differ in terms of the substrate thickness, pit width and track width, an appropriate beam spot needs to be prepared in order to obtain effective reflected light signal characteristics. DVDs require a smaller beam spot and have a shallower pit depth compared with CDs, and thus a beam spot suitable therefor is needed. Switching of beam spots may be conducted by switching beams having different wavelengths.

That is, the optical pick-up device 21 comprises at least the below-mentioned means. Namely, a plurality of optical systems having beam spots of different sizes or different wavelengths, a switching mechanism for selecting one of the plurality of the optical systems and arranging the selected optical system facing to the optical disk mounted on the device, a light detecting element portion for detecting the reflected light of a beam irradiated to the optical disk, a focus adjusting mechanism for the optical disk, and a tracking adjusting mechanism for the above-mentioned optical disk. For example, a plurality of optical systems having different wavelengths may have wavelengths of 650 nm, 780 nm and 685 nm.

A detected signal obtained from a plurality of photo diodes comprising the light detecting element portion of the light pick-up device 21 is inputted to a preamplifier 23. From the preamplifier 23, a synthesized signal HF of the output (A, B, C, D) of a four-split photo diode, a focus error signal, an (A+C) signal and, a (B+D) signal from the detected signals of the four-split photo diode, and an (E+F) signal, which serves as a tracking error signal for CD can be obtained.

The synthesized signal HF is wave-form equalized via an equalizer and inputted to a DVD/CD signal processing portion 25. The DVD/CD signal processing portion 25 can be switched between the DVD processing mode and the CD processing mode according to a controlling signal from a system controlling portion 100 later described. Equalizers and signal processing portions may be prepared each for DVDs and for CDs. Although not illustrated in the figure, an appropriate gain setting signal may be provided to other driving amplifier in the servo system from the controlling portion 100 according to the kind of the disk.

In the above-mentioned system, it is preferable that a sub beam/main beam system is adopted in reproducing a CD utilizing detected signals A to F and a one beam system (main beam system) is adopted in reproducing a DVD utilizing detected signals A to D.

The sub beam/main beam system is, specifically, a system including both a three beam system and a one beam system. The three beam system is, as later described, a system wherein a reflected light is picked up by at least a four-split photo diode and a diode arranged in the vicinity of the diode to utilize outputs A to F thereof. The one beam system is a system wherein a reflected light is picked up by a photo diode to utilize outputs A to D thereof.

The focus error signal is inputted to an S-letter level detector 26B through a filter 26A for reducing noise and also to a compensation amplifier 27. The output from the compensation amplifier 27 is inputted to a driving circuit 28 to become a focus controlling signal, and then provided to a focus controlling mechanism of the light pick-up device 21.

In the above-mentioned system, if the system controlling portion 100 selects and switches to an optical system, at the same time, or subsequently, characteristics of the servo system and the signal processing system connected to the later stage or the route itself will be switched automatically.

Figure 4:
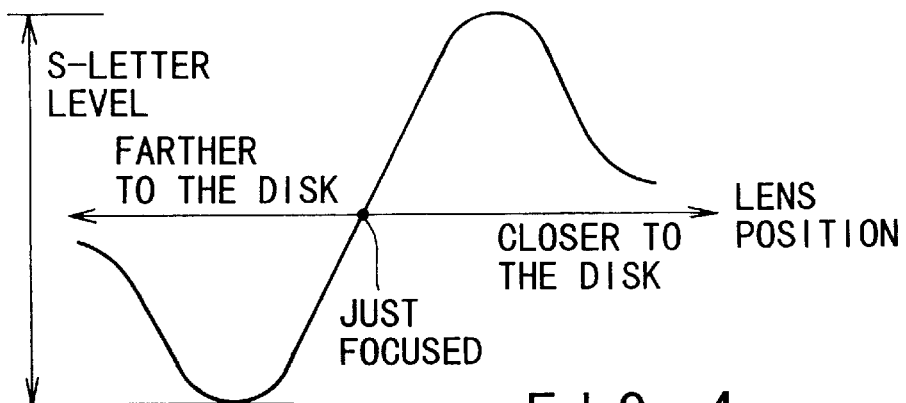
FIG. 4 is a diagram illustrating the characteristics of a focus error signal.

FIG. 4 illustrates the change of a focus error signal according to the state of focusing. The change is detected at an S-letter level detector 26B. Although a focus error signal is generated from the detected signal of the main beam in the embodiments it can be generated from the detected signal of the sub beam because detected signals of a sub beam have a similar S-letter characteristics according to the state of focusing even though they differ from those of the main beam in level. In this case the sub beam detector may be constituted of a four-split photo diode.

The detected level information detected here is inputted to the system controlling portion 100. The system controlling portion 100 makes judgment of the kinds of optical disks utilizing the S-letter detection level as later described.

From the preamplifier 23, as described later in details an (A+B) signal, a (B+D) signal and an (E−F) signal detected by a photo diode of a light pick-up device 21 are obtained. Among these, the (A+C) signal and the (B+D) signal are inputted to a phase difference detector 31. The phase difference detector 31 obtains a tracking error signal for DVD by detecting the difference between the (A+B) signal and the (B+D) signal. The tracking error signal for DVD is provided to one side of a switch 32. The (E−F) signal is used as a tracking error signal for CD, and the signal is provided to the other side of the switch 32. The switch 32 is switched according to the system setting mode of the system controlling portion 100 and the disk kind judging signal, that is, if a CD is placed as the disk 11, a tracking error signal for CD is selected, and if a DVD is placed, a tracking error signal for DVD is selected. A signal outputted from the switch is inputted to a compensation amplifier 33. An output from the compensation amplifier 33 becomes a tracking controlling signal via a driving circuit 34, and then provided to a tracking controlling mechanism of the light pick-up device 21. Furthermore, a signal with a lot of controlling amount is provided to a feed motor 22 via a driving circuit 35.

In the DVD/CD signal processing portion 25, the frequency and the phase of a reproduced signal is detected and a controlling information included in the reproduced signal is demodulated, and a disk motor control signal is generated according to the controlling information such as a synchronizing signal. A servo loop is formed by providing the disk motor control signal to a disk motor 12 via a driving circuit 36.

The system controlling portion 100 provides controlling signals to the equalizer 24 and the DVD/CD signal processing portion 25. The controlling signals are for switching equalizing characteristics and a processing clock or the operation state of the equalizer 24 and the DVD/CD signal processing portion 25 according to the setting of the CD mode or the DVD mode. Further, the system controlling portion 100 can switch and set response characteristic and operation mode of each servo system.

From the system controlling portion 100, controlling signals are provided to the switch 32. The controlling signals control the switch 32 to pick up a tracking error signal from the phase difference detector 31 in the DVD mode and to pick up an (E−F) signal as a tracking error signal in the CD mode. From the system controlling portion 100, controlling signals are provided also to the compensation amplifier 33 in the tracking servo loop. The controlling signals are for switching the loop characteristics of the tracking servo loop, and thus specifically speaking, are gain switching signals. From the system controlling portion 100, controlling signals are provided also for the compensation amplifier 27 of the focus servo loop. The controlling signals also are gain switching signals for switching loop characteristics of the focus servo loop.

Furthermore, the system controlling portion 100 can forcibly stop or move the servo operation instead of automatic operation when the disk judgment is conducted.

In FIG. 5, alignment of photo diodes A to F and the inside of the preamplifier 23 comprising the light detecting portion of the light pick-up device 21 are shown. Output of each of the photo diodes A to F are introduced to buffer amplifiers 23a to 23f respectively.

The A to F signals outputted from the buffer amplifier 23a to 23f are calculated as mentioned below.

An adding device 231 generates (A+B) signals and an adding device 232 generates (C+D) signals. A subtracting device 233 generates (A+B)−(C+D) signals utilizing the (A+C) signals from the adding device 231 and the (C+D) signals from the adding device 232. The (A+B)−(C+D) signals are used as focus error signals.

An adding device 234 generates (A+C) signals, and an adding device 235 generates (B+D) signals. The (A+C) signals and the (B+D) signals are inputted to a phase difference detector 31. The output from the phase difference detector 31 is used as a tracking error signal for DVD. That is, when the device is on the DVD mode, a switch 321 is controlled to turn on. On the other hand, an (E−F) signal obtained based on a detected signal of the sub beam is ignored with a switch 322 turned off.

The (A+C) signals and the (B+D) signals are inputted also to an adding device 236. The adding device 236 generates an (A+B+C+D) signal (hereinafter abbreviated as an HF signal).

E signals and F signals are inputted to an adding device 237. From the adding device 237, (E–F) signals can be obtained. The (E–F) signals are used as a tracking error signal for CD. That is, when the device is on the CD modes the switch 322 is controlled to turn on.

In the above-mentioned system, first, one of a plurality of optical systems is set based on the control of the system controlling portion 100. For example, when an optical system is set to be the CD mode, the system controlling portion 100 recognizes that and automatically switches the other related signal processing systems to be the CD mode accordingly. Signal processing system include a DVD/CD signal processing portion 25 and a servo system. On the other hand, when an optical system is set to be the DVD mode, the system controlling portion 100 recognizes that and automatically switches the other related signal processing systems to be the DVD mode accordingly.

As mentioned above, since various kinds of disks exist, reproduction and recording devices need to have a plurality of optical systems to correspond to different kinds of disks, and a signal processing system capable of switching a plurality of characteristics, or signal processing systems corresponding to each optical system.

Here the system operation with a disk positioned in a reproduction and recording device will be explained.

In the manual mode, a user can input the kind of the disk in advance from the operating portion of the reproduction and recording device. In this case, the disk kind information is inputted to the system controlling portion 100 to be acknowledged. Based on the acknowledged information, as mentioned above, an optical system and a signal processing system corresponding to the kind of the disk are set by the system controlling portion 100.

In the automatic mode, when a disk is placed, an automatic judgment function works for judging the kind of disk. The information obtained by the automatic judgment function is acknowledged by the system controlling portion 100. Based on the acknowledged information, as mentioned above, an optical system and a signal processing system corresponding to the kind of the disk are set by the system controlling portion 100. It is also possible that the automatic judgment device functions even after a user makes judgment of the kind of the disk and inputs an initial system setting state by the manual operation. In such a case, the device would correct a possible misjudgment of the user on the kind of the disk. Furthermore, it is also possible that the device is automatically set to be a certain initial state when a disk is placed or set to be the state of the preceding use.

Although when a plurality of optical systems and a plurality of signal processing characteristics of a signal processing system have a relationship corresponding one to one, an optical system is set beforehand in the explanation above, naturally a signal processing characteristic may be set beforehand or both can be set at the same time.

A signal processing system include the below-mentioned circuits. A reproduced signal processing portion for demodulating and reproducing a recorded signal from an optical disk utilizing a pick-up signal from a pick-up device, a focus servo circuit, which is a servo system for conducting the focus control of the optical system of the pick-up device utilizing a pick-up signal from the pick-up device and capable of switching characteristics, and a tracking servo circuit, which is a servo system for conducting the tracking control of an optical system of the pick-up device utilizing a pick-up signal and capable of switching characteristics.

Next, automatic judgment of the type of a placed disk 11 will be explained.

An optical system (lens) of the light pick-up device 21 is set to be either one. That is, the light-pick-up device 21 inevitably set to be either mode (CD mode or DVD mode) in the initial state according to a switching signal from the system controlling portion 100. At that time, a focus servo and a tracking servo system are also set to be the mode corresponding to the initial setting mode of the optical system by the system controlling portion 100. Similarly, the signal processing portion 25 is set to be the mode corresponding to the initial setting mode of the optical system.

One-layer disks of CD or DVD and two-layer disks of DVD-ROM or DVD-RAM differ in terms of a refractive index of an irradiated light beam. The phenomenon that refractive indexes of light beams differ according to the kind of the disk is utilized effectively.

A refractive index of a one-layer disk of CD or DVD is about 60 to 70%, two-layer disk of DVD-ROM is 25 to 30%, and one-layer disk of DVD-RAM is 20% or less.

Therefore, for example, when a focus error signal is at a high level (H), judgment is made that a one-layer disk of CD or DVD is mounted, and when a focus error signal is at a low level (L), judgment is made that a two-layer disk of DVD-ROM or a two-layer disk of DVD-RAM is mounted.

Further, judgment on whether it is a two-layer disk (a two-layer disk of DVD-ROM) or a one-layer disk (a one-layer disk of CD or DVD) can be made from the number of focal planes learned from a focus signal obtained by first arranging a lens at a position far from a disk and gradually moving the lens toward the disk. In the case, the disk may be stopped without rotation or may rotate for less than half turn or at a constant rate (slow rotation). In this case, it is preferable that a rotation servo system has a forcible rotation control rather than automatic drive since with the servo system on, rotation may be rampant.

A rotation rate of a constant rotation is preferably the rate of the inner periphery of CLV or the maximum rotation rate of the predetermined disk. The rotation rate is similarly applied to the case for obtaining a tracking error signal for judging a disk as later described. Then, with the focus servo on, a focus is set.

Then, reading process is conducted for detecting a RAM threshold signal.

Figure 6:
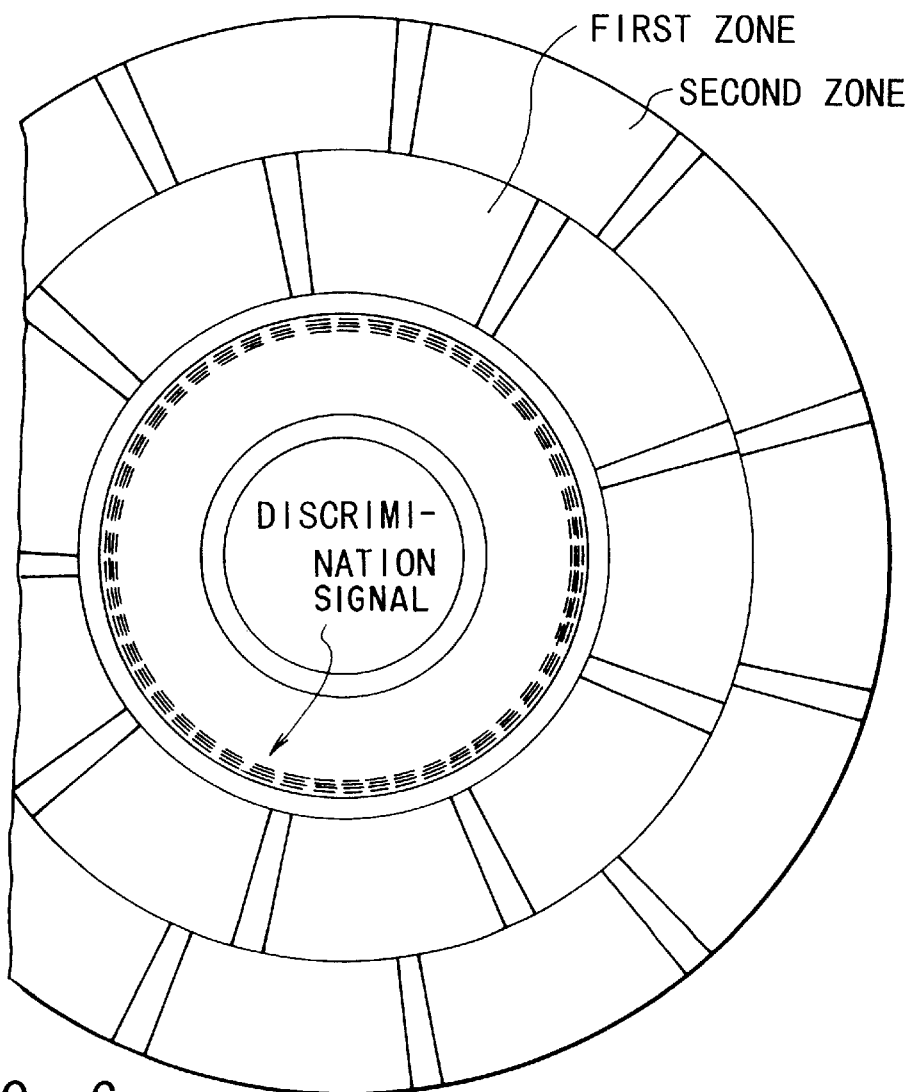
FIG. 6 is a diagram illustrating an example of a recordable discrimination signal of an optical disk.

FIG. 6 illustrates the signal recording state of a DVD-RAM. In the case of a DVD-RAM, as shown in FIG. 6, a discrimination signal having a pit longer than the longest data pit is recorded at the inner periphery portion of the disk. Therefore, by detecting the discrimination signal, a judgment is made on whether it is a DVD-RAM or not. For the judgment of DVD-RAM, other methods can be used, such as recording a discrimination signal having a pit shorter than the shortest data pit at the outer periphery portion of the disk. That is, if only a data pit outside the length range of the data pit as a threshold signal is provided, judgment can be made.

By the judgment heretofore explained, (1) a one-layer disk of CD or DVD, (2) a two-layer disk of DVD-ROM and (3) a one-layer disk of DVD-RAM can be distinguished. For a two-layer disk of DVD-ROM, a signal processing, a servo system and an optical system can be set suitably. For a one-layer disk of DVD-RAM, a recording system is established and an optical system and a servo system are set.

Then a judgment is made on the size of a tracking error signal.

(1) With the initial setting of the device of CD, if a provided disk is CD, the tracking error signal is large, and if a provided disk is DVD, the tracking error signal is small because a track pitch of a DVD is small and a beam spot is large and thus the change of the tracking error signal is small.

(2) With the initial setting of the device of DVD, if a provided disk is DVD, the tracking error signal is large, and if a provided disk is CD, the tracking error signal is small because a track pitch of a CD is large and a beam spot is small and thus generation of a track error does not cause a great change.

Accordingly, judgment of various kinds of disks can be made.

(First Disk Judgment Program)

Figure 7:
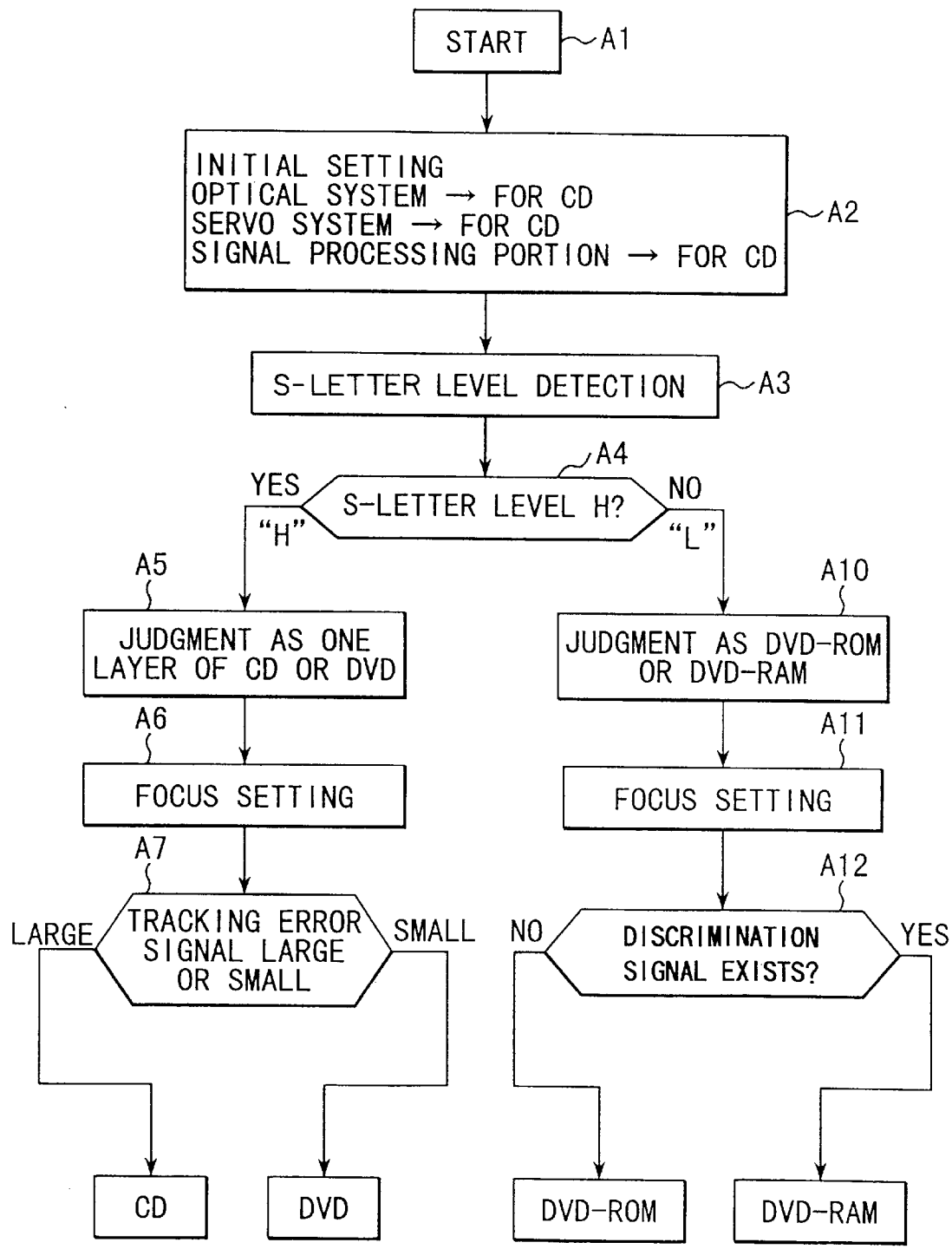
FIG. 7 is a flow chart illustrating an example of the disk distinguishing processing of the invention.

FIG. 7 is a flow chart of a disk judgment program accommodated in the system controlling portion 100.

When a disk distinguishing function starts, first initial setting is done automatically. An optical system, a signal processing portion and a servo system are set for CD. Then A lens is set at a certain position for picking up a focus error signal to judge the S-letter level (steps A1 to A4). If the S-letter level is high (H), the disk is judged to be CD or one-layer DVD. Then after adjusting the focus, the disk is rotated and judgment is made on a tracking error signal (steps A5 to A7). As the tracking error signal, an (E-F) signal is used. With the tracking error signal larger than a certain values the disk is judged to be CD and with the tracking error signal smaller than the certain value, the disk is judged to be DVD. The certain value can be set by preliminary experiments for the level of distinguishing CDs and DVDs.

In the step A4, if the S-letter level is low (L), the disk is judged to be DVD-ROM or DVD-RAM of two layers. Then after adjusting the focus, the disk is rotated (steps A10, A11). And judgment is made on the existence of a discrimination signal. If the discrimination signal (as shown in FIG. 6) exists, the disk is judged to be DVD-RAM and if it does not exist, the disk is judged to be DVD-ROM (step A12).

During the above-mentioned processing, the disk is rotated while controlling the tracking with the CLV (Constant Linear Velocity) control off and a forcible constant rotation is achieved. This is because a rotation servo or tracking servo system of the disk may be rampant with the CLV control when the setting of the device does not meet the kind of the disk. Before the control of tracking, a disk judgment process (step A4) is conducted.

Having the disk judgment process before tracking control has the following meaning. A DVD-ROM has a pit depth of $\lambda/4$, and a DVD-RAM has a pit depth of $\lambda/8$. Therefore, without clear acknowledgment of the kind of the disk, a correct tracking control cannot be conducted. Besides, as mentioned above, there is a possibility that a rotation servo system or a tracking servo system of the disk may be rampant.

(Second Disk Judgment Program)

Figure 8:
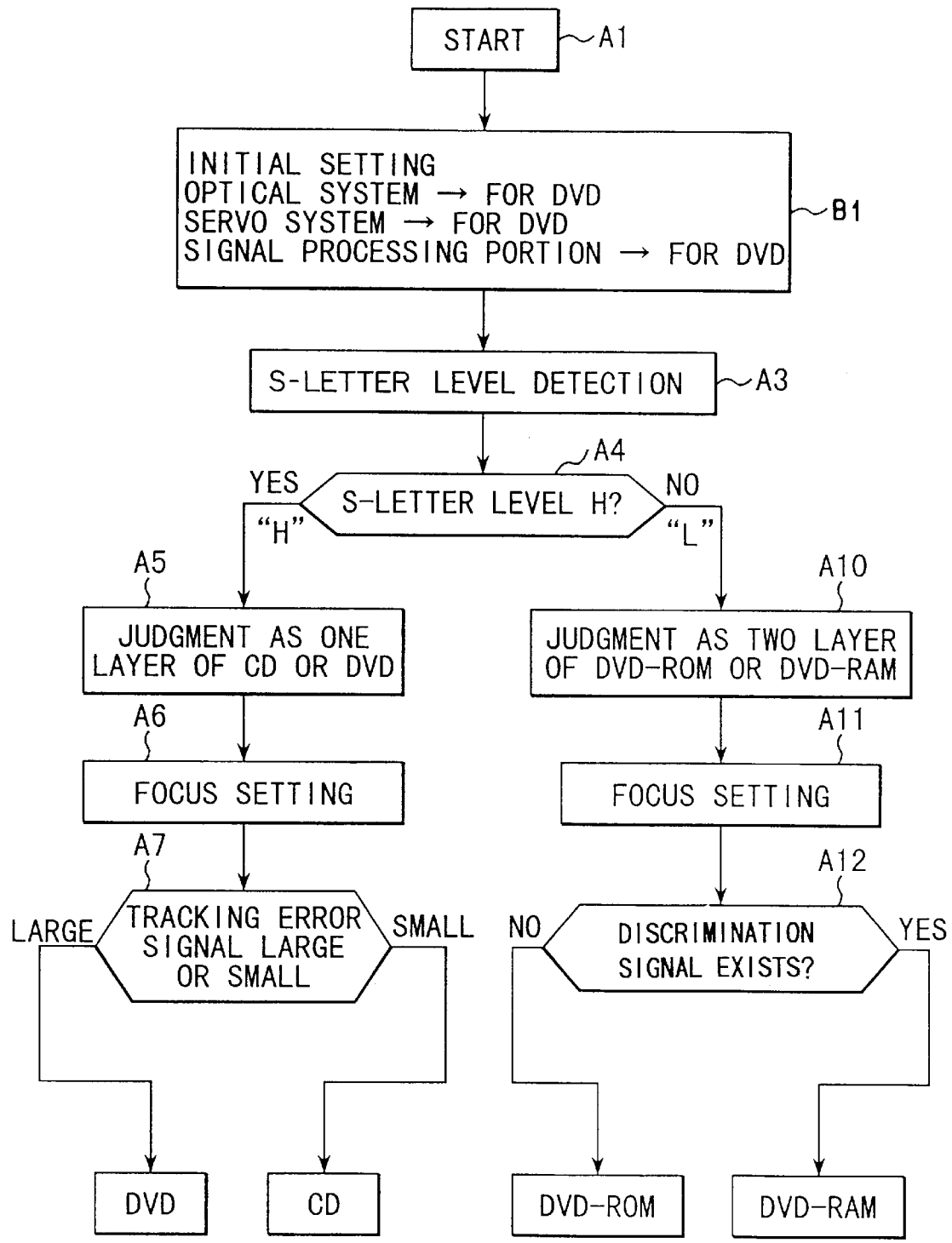
FIG. 8 is a flow chart illustrating another example of the disk distinguishing processing of the invention.

FIG. 8 is another flow chart of a disk judgment program accommodated in the system controlling portion 100. This program differs from the program shown in FIG. 7 only in the initial setting conditions. That is, in this program, as the initial setting following the step A1, a lens for DVD is set for the optical system, and a servo system and a signal processing system are set for DVD.

With such an initial setting, the output from the phase difference detector 31 is used for a tracking error signal in the step A7. With the CLV control off, the disk is rotated for checking the size of the tracking signal, and if the signal is large, the disk is judged to be DVD, and if the signal is small, the disk is judged to be CD. Since the other steps are the same as the processing shown in FIG. 7, details are not described here.

(Third Disk Judgment Program)

Figure 9:
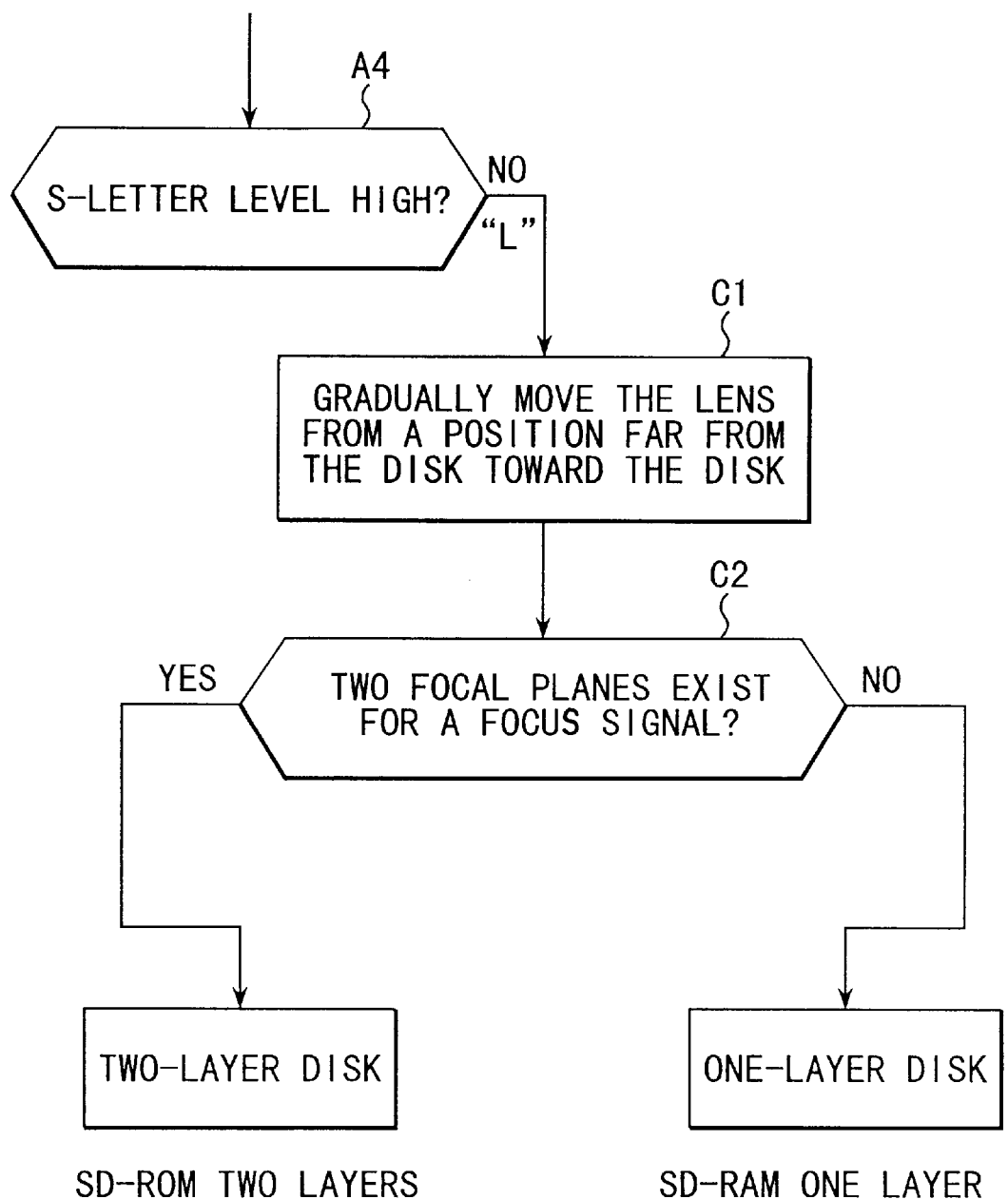
FIG. 9 is a flow chart illustrating still another example of the disk distinguishing processing of the invention.

FIG. 9 is still another flow chart of a disk judgment program accommodated in the system controlling portion 100. In the programs shown in FIGS. 7 and 8, after the judgment that the disk is a two-layer DVD-ROM or a one-layer DVD-RAM in the step A4, a discrimination signal is searched for judging either of them. However, in this program, judgment is made on whether two focal planes exist for a focus signal by gradually moving a lens from a position far from a disk toward the disk (steps C1, C2). If two focal planes exist for a focus signal, it is a two-layer disk (DVD-ROM), and if one focal plane exists, it is a one-layer disk (DVD-RAM)

(Fourth Disk Judgment Program)

FIG. 10 is still another flow chart of a disk judgment program accommodated in the system controlling portion 100. In this judgment program, after the initial setting, judgment is made whether two focal planes exist for a focus signal, that is, whether a detection signal for an S-letter curve can be obtained twice by gradually moving a lens positioned far from a disk toward the disk (steps D1 to D4). If two focal planes exist for a focus signal, it is judged to be a two-layer disk (two-layer DVD-ROM) (step D5). If one focal plane exists, it is a one-layer disk, namely, either a CD, DVD-RAM, or one-layer DVD-ROM.

Therefore, again, judgment is made on the S-letter level of a focus error signal. If the S-letter level is high (H), it is CD or one-layer DVD-ROM (steps D6, D7). If the S-letter level is high, a judging process the same as the steps A5 to A7 shown in FIGS. 7 and 8 is conducted. If the S-letter level is low (L), it is one-layer DVD-ROM or DVD-RAM (step D8), then judgment is made on whether it is a one-layer DVD-ROM or DVD-RAM in the process the same as steps A11, A12 shown in FIGS. 7 and 8.

Figure 11:
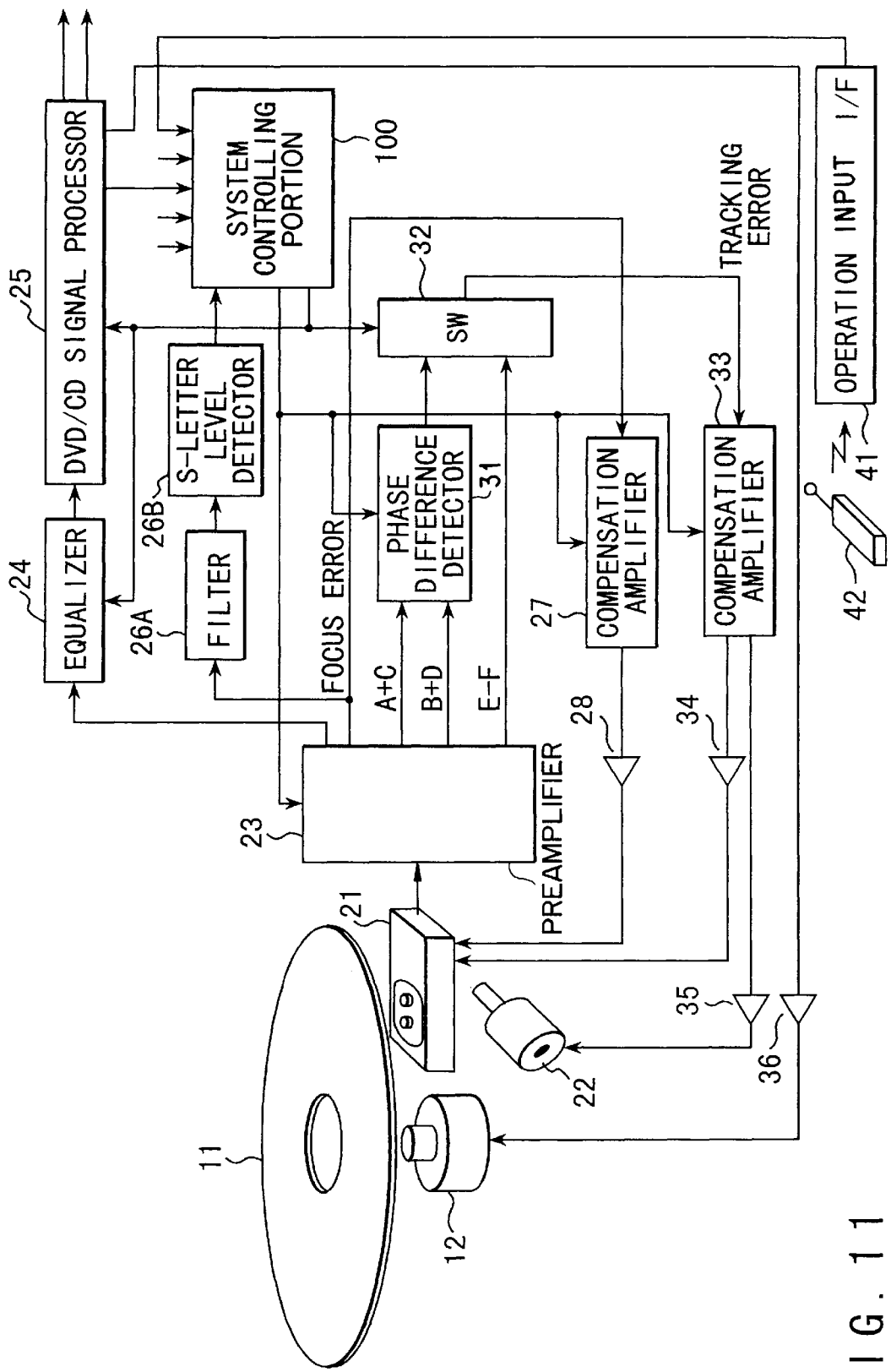
FIG. 11 is a chart illustrating another embodiment of a reproduction device of the invention.

FIG. 11 is another embodiment of the invention.

In the above-mentioned embodiments, methods of automatic disk judgment are described, but methods including users' operation may be used as well. Namely, a method of distinguishing a disk by a disk selection button of a player at the time of placing the disk may be used, and the following can be applied as well.

In FIG. 11, numeral 41 denotes an operation input interface for receiving an operation signal from a remote control operator 42 and supplying it to the system controlling portion 100. If a user starts reproduction or processing, the device displays at the display portion a requirement of the input of a disk distinguishing signal. The display portion may be a television screen or a display portion of the remote control operator 42, and further, a warning sound may be added. If a disk distinguishing signal is already inputted, the next process will be conducted.

(Fifth Disk Judgment Program)

Figure 12:
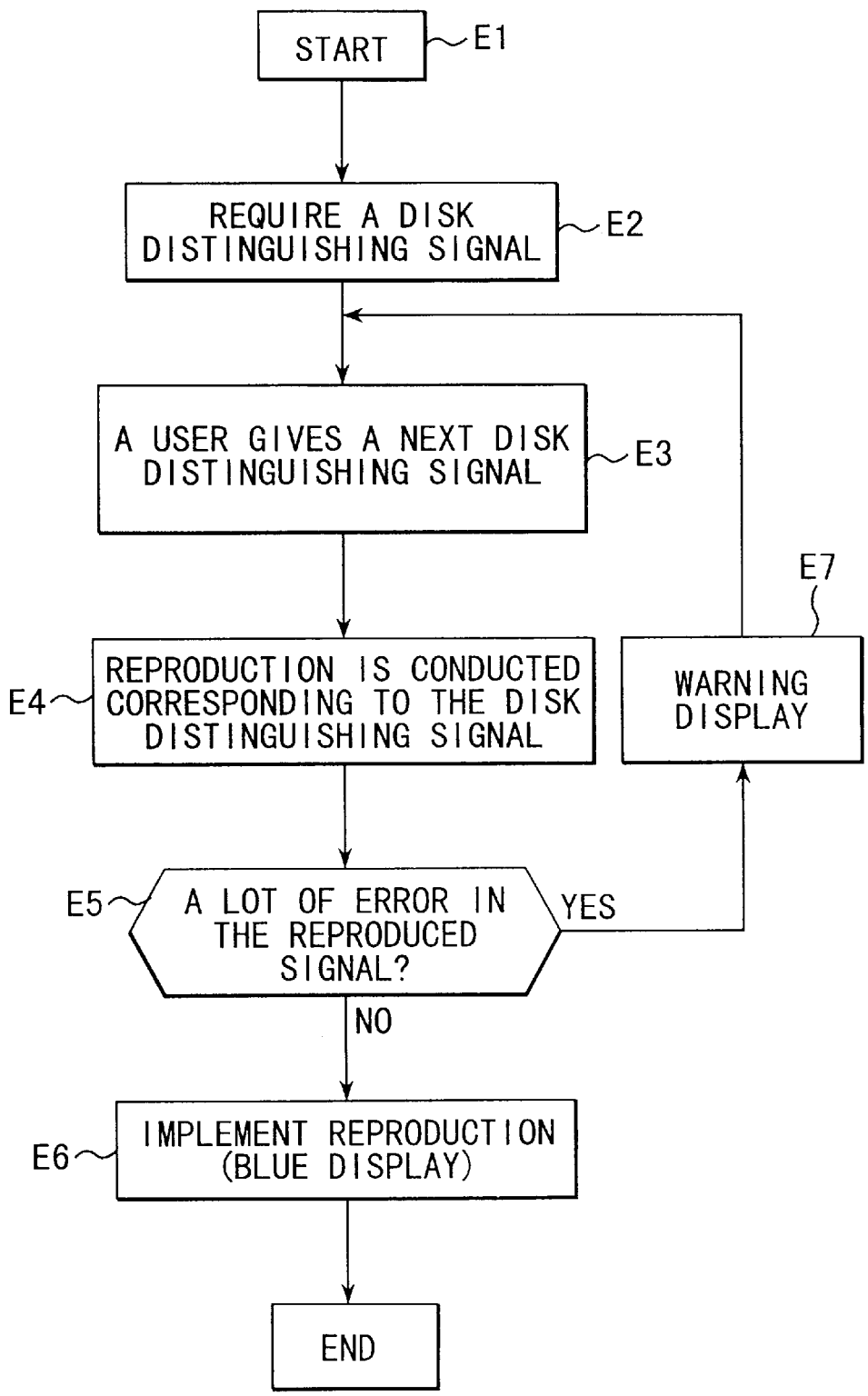
FIG. 12 is a flow chart illustrating another example of the disk distinguishing processing of the invention.

FIG. 12 is a flow chart illustrating an embodiment of the above-mentioned system.

When the device starts, a requirement of the input of a disk distinguishing signal is shown in a display portion (sound may be added) (steps E1 to E2). When a user inputs a disk distinguishing signal, the system automatically starts for rotating the disk (but with a usual servo operation curbed) and starting a focus servo and a tracking servo (steps E3, E4). The judgment is made on whether a lot of errors exist in a reproduced signal. If there is no error, a blue safety sign is indicated in the display portion and reproduction or recording is implemented (steps E5, E6). However, if a servo signal is unusual or there is an error in a reproduced signal, a warning sign is indicated in the display portion requesting another judgment input (step E7). The user inputs a disk judgment input responding to the warning so as to control the device for finding the corresponding kind of the disk. When a blue safety sign is indicated in the display portion, the user stops the judgment input.

(Sixth Disk Judgment Program)

Figure 13:
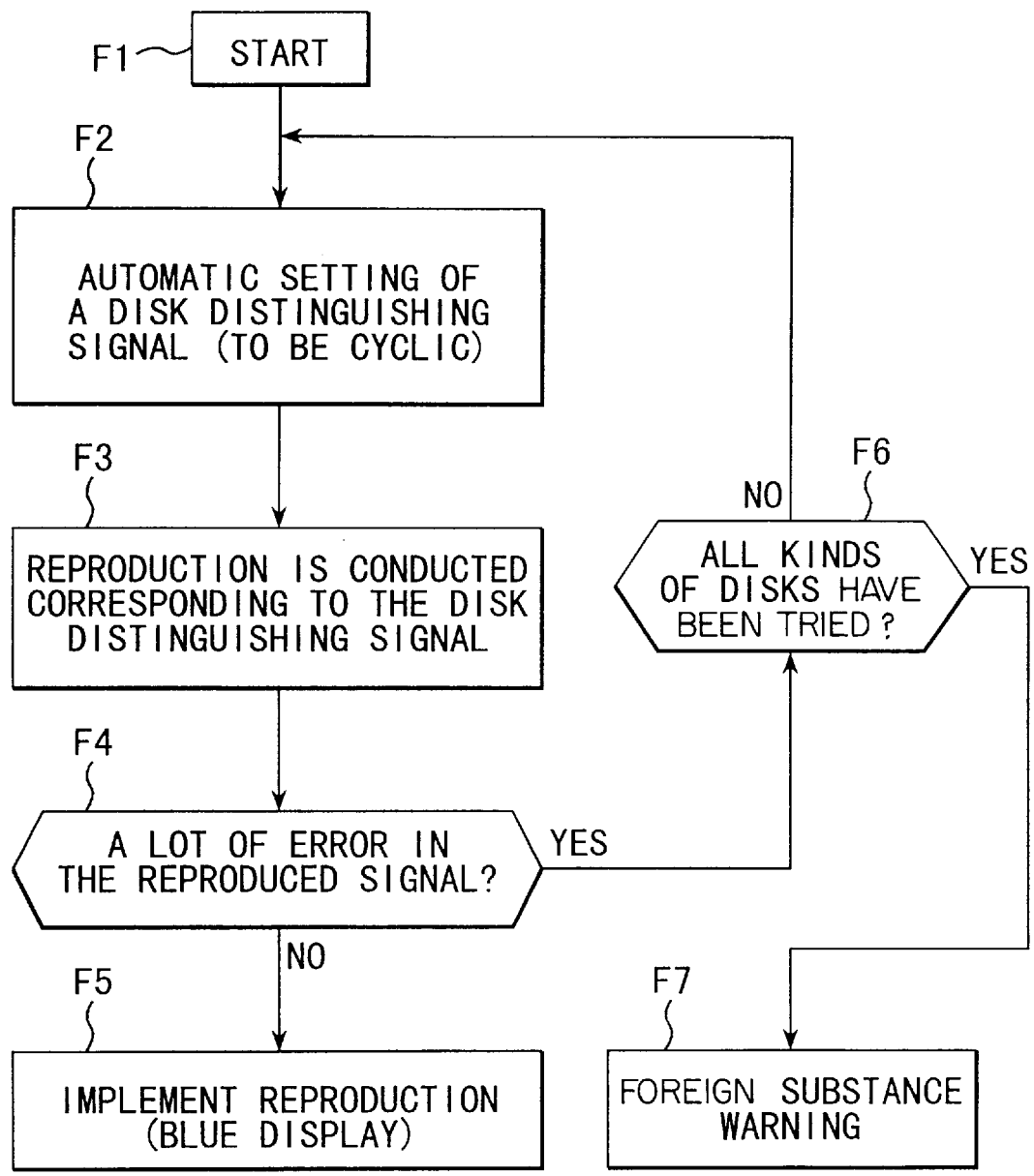
FIG. 13 is a flow chart illustrating still another example of the disk distinguishing processing of the invention.

FIG. 13 is another embodiment of a flow chart of the above-mentioned system.

In this flow chart, a device itself automatically designates a disk distinguishing signal cyclically for implementing reproduction corresponding to the disk distinguishing signal. That is, judgment is made on whether a lot of errors exist in a reproduced signal or not, and if there is no error, the placed disk is judged to be corresponding to the disk distinguishing signal, and the reproduction processing is started (steps F1 to F5). However, if a lot of errors exist, judgment is made on whether all the settings of conceivable kinds of disks are tried or not, and if not all of them are tried, a process of the step F2 will be conducted again for trying the next setting again. If judgment is made that all the settings of the conceivable kinds of disks have been tried in the step F6, judgment is made that a foreign substance is placed and warning sign is indicated (steps F6, F7).

(Seventh Disk Judgment Program)

Figure 14:
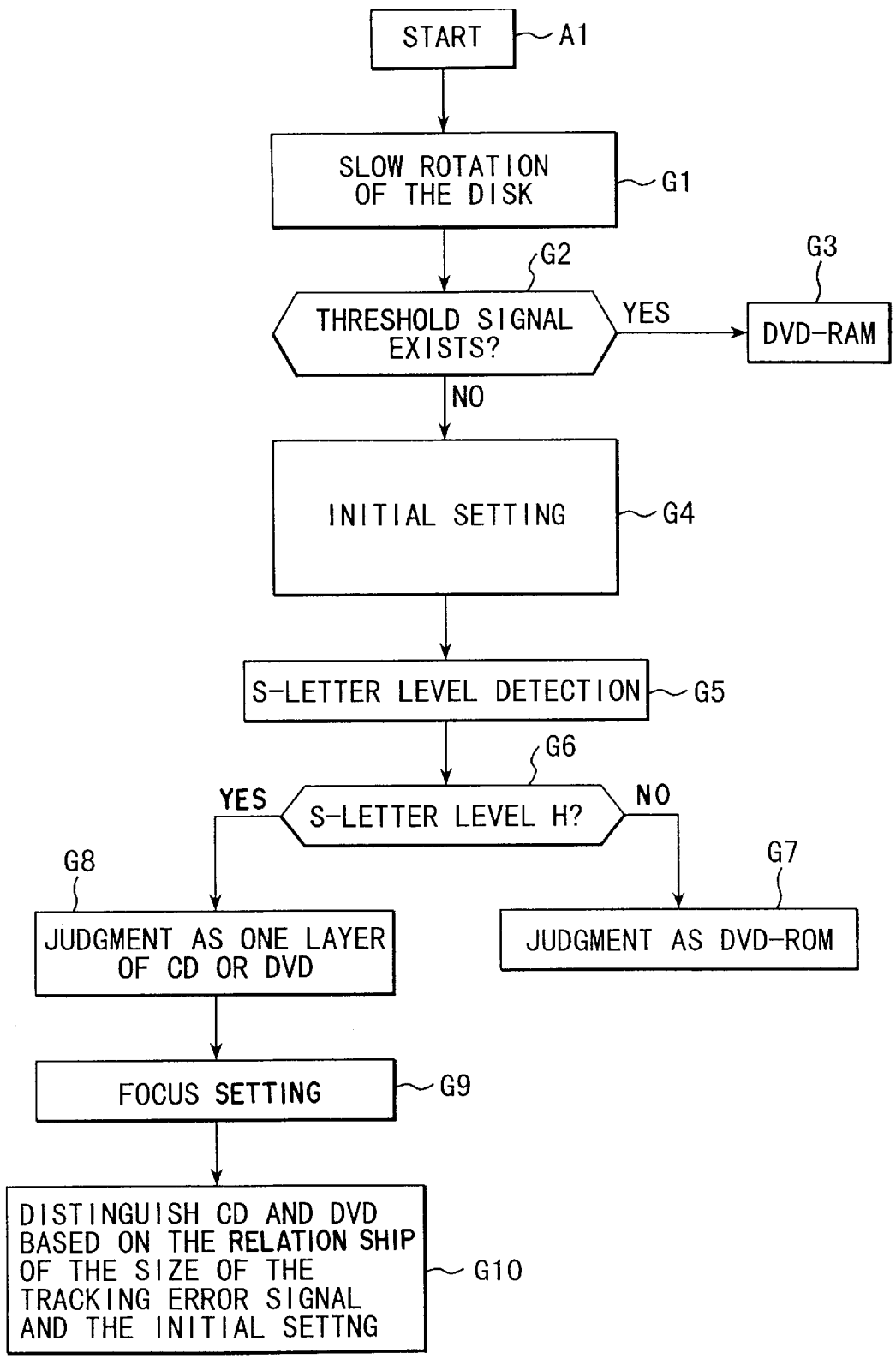
FIG. 14 is a flow chart illustrating still another embodiment of a reproduction device of the invention.

FIG. 14 is still another embodiment of a flow chart of the above-mentioned system.

This flow chart shown a method of searching a threshold signal denoting a DVD-RAM as shown in FIG. 6. This is because judgment on whether the disk is recordable or not is regarded important for preventing recording error.

That is, after starting, a disk is rotated slowly and judgment is made on whether a threshold signal exists or not. If there is a threshold signal, it is judged to be DVD-RAM (steps A1, G1 to G3). If there is no threshold signal, judgment should be made on whether it is a CD, one-layer DVD-ROM, or two-layer DVD-ROM. Therefore, initial setting of the system is conducted as mentioned above (step G4), and the S-letter level is detected (steps G5, G6). If the S-letter level is lower than a certain value, it is judged to be a two-layer DVD-ROM. If the S-letter level is higher than the certain value, it is judged to be a CD or a one-layer DVD-ROM (step G8). Then the focus is set and the disk is rotated for about a half turn and a tracking servo is turned on. In this case, the rotation servo is turned off and the rotation is made forcibly. This is for preventing rampant rotation of the disk. With the tracking servo on, judgment is made on the size of the tracking error signal. The tracking servo is set for DVD or for CD according to the initial setting. According to the initial setting conditions and the size of the tracking error signal, judgment can be made on whether it is CD or DVD (steps G9, G10).

Although processes until judging the kind of the disk were explained in the above, naturally the system controlling means reset the signal processing portion, the focus servo means and the tracking servo means so as to correspond to the judged kind of the disk for enabling the system to conduct reproduction or recording.

Furthermore, the following function may be added into this system.

That is, a function to determine whether the judged kind of disk is the disk requested by the user may be added.

Namely, when the user inserts a CD inadvertently instead of a DVD, the reproduction device would automatically switches to the CD reproduction mode to start reproduction operation. Then the display does not show a picture despite the user's anticipation since the user assumes a DVD is placed. In such a case the user may mistakenly believe that there is a malfunction in the reproduction device. In order to prevent such a misunderstanding, it is also possible to allow a user to input information on the kind of the disk to be reproduced by an operation device so as to compare the result of the automatic judgment and the inputted information, and in the case there is discrepancy, indicate such in the display portion.

In the explanation above, the function shown in FIG. 13 is to find whether the kind of the disk placed in the reproduction device is different from the kind of the disk to be reproduced by the reproduction device.

This function may be used in combination with the function explained with reference to FIGS. 7 to 10. Namely, a combination of after the determination of whether the amount of error is large or not as illustrated in FIG. 13 and automatic judgment on the kind of the disk, an automatic judgment function of FIGS. 7 to 10 may be applied. Accordingly, when a foreign substance is inserted into the device, it can be detected in an early stage.

Although the disk judgment mentioned above utilizes properties of the disks, the following method may be used when judging whether the inserted disk is appropriate or not according to the amount of the detected noise.

Figure 15:
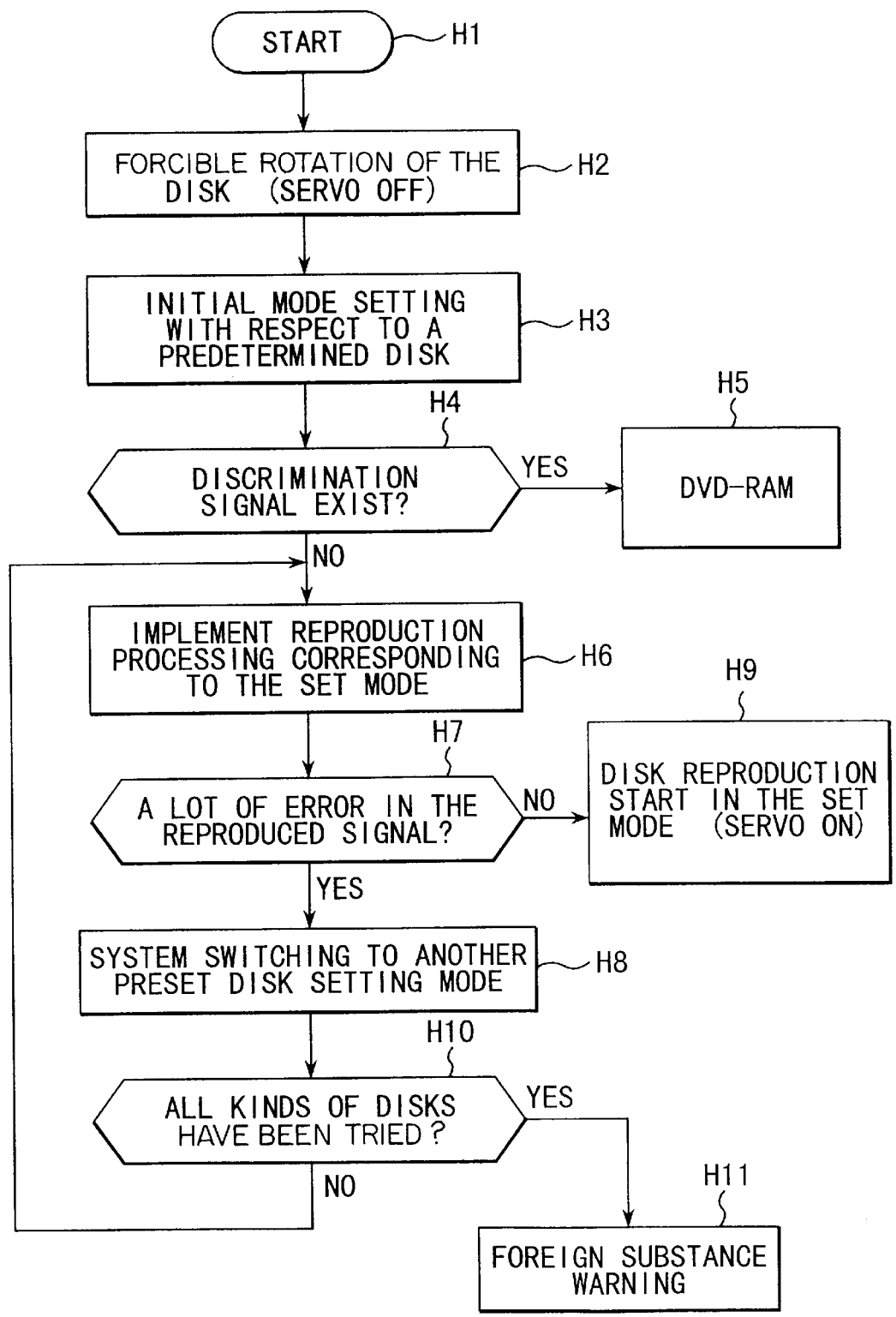
FIG. 15 is a flow chart illustrating still another example of the disk distinguishing processing of the invention.

FIG. 15 is still another embodiment of a flow chart of the disk distinguishing process the above-mentioned system.

That is, when a disk is placed, the disk is rotated automatically (steps H1, H2) with the servo off. As to an optical system, a certain focus is set, and a beam characteristic is set corresponding to an assumed disk (step H3). Then judgment is made on whether a threshold signal indicating DVD-RAM exists or not (step H4). When a threshold signal is detected, since the disk is a DVD-RAM, the device is prepared for recording, and it is indicated at the front part of the reproduction device (step H5).

When a threshold signal is not detected, reproduction processing is conducted (step H6). If a lot of errors are found in the reproduced signal, the kind of the present disk is judged not to be the one set by the reproduction device (step H7). Then another reproduction processing is tried with another kind of a disk mode (step H8).

Accordingly, the device itself designates a disk distinguishing signal automatically and cyclically to conduct reproduction according to the disk distinguishing signal. Then judgment is made on whether a lot of errors exist in the reproduced signal, and when there is no error, the placed disk is judged to be corresponding to the set disk distinguishing signal, and the reproduction processing follows (step H9). However, when there are a lot of errors, judgment is made on whether all the conceivable settings of the kinds of the disks have been tried (step H10), and if not, the program returns to the step H6. In the step H10, after trying all the conceivable settings of the kinds of the disks, judgment is made that a foreign substance exists in the device and a warning sign is indicated (step H11).

In the explanation mentioned above, in step H3, an initial mode is automatically set at the time of inserting a disk, and also in step H8, input information of switching the kind of the disk is automatically designated. But it is possible that a user may operate the designation manually or by a remote control operation.

The kinds and switching mechanisms of a plurality of optical systems used in the above-mentioned device will next be explained in detail.

An optical system of a light head is illustrated in FIGS. 16 and 17.

For example, a divergent laser beam having a wavelength of 650 nm is generated from a semiconductor laser 350. In general in reproducing information, a reproduction laser beam with a substantially constant intensity is generated from the semiconductor laser 350. And in recording information a recording laser beam having a comparatively large light intensity processed with intensity modulation according to the recorded data is generated. In erasing recorded information, an erasing laser beam having a substantially constant intensity larger than the beam for reproduction is generated.

The laser beam outputted from the semiconductor laser 350 is collimated by a collimator lens 352 and enters a half prism 353 as a collimate laser beam. Then the laser beam goes straight through a half mirror 353A provided in the half prism 353 toward an object lens 334 via a first or second aperture 354 or 359 later described.

The first and second apertures 354, 359 are selected according to the thickness of the transparent substrate of an optical disk 11 (1.2 mm (see FIG. 1A) or 0.6 mm (see FIGS. 1B and 1C) and the size of the light beam irradiated to the optical disk 11 is selected according to the thickness of the transparent substrate as later described. The laser beam collected by the object lens 334 after passing through a first or second aperture 354 or 359 is directed to the optical disk 11, refracted by the transparent substrate of the optical disk 11, and collected to a reflecting layer formed on the transparent substrate so as to form a beam spot on the reflecting layer (recording surface).

Here a smallest beam spot corresponding to the beam waist of the laser beam is formed on the reflecting layer while the object lens 334 is maintained in the focusing state. On the reflecting layer of the optical disk 11, a track is formed concentrically or spirally as the information recording area, and a physical recording portion such as a pit is formed in the track. In general, a track servo mechanism functions to finely move the object lens 334 or the light head for maintaining the tracking conditions where the track is traced by a laser beam.

In reproducing information, a laser beam for reproduction is modulated at the recording portion of a track formed on the reflecting layer, and the modulated laser beam is reflected from the reflecting layer. In recording information, physical change is provided to the reflecting layer in the track by the modulated laser beam to form a recording portion. Further, in erasing, the physical change provided to the recording portion is revived by irradiating a laser beam for erasure to the recording portion.

The laser beam reflected from the reflecting laser is again collected by the object lens 334, and returned to the half prism 353 via the first or second aperture 354 or 359. The laser beam reflected by the half mirror 353A in the half prism 353 is directed to a projection lens 357 and collected to a light detector 358 by the projection lens 357. In reproduction, the laser beam for reproduction modulated at the recording portion is converted to a detection signal by the detector 358, and a reproduction signal, a focus signal and a tracking signal are generated by a signal processing circuit (not illustrated) from the detection signal. For recording or erasure, a laser beam for recording or erasure is detected by the detector 358, and a focus signal and a tracking signal are generated by the signal processing circuit from the detection signal.

The above-mentioned first and second apertures 354, 359 are selected according to the structure of the optical disk 11, that is, the thickness of the transparent substrate of the optical disk, as illustrated in FIG. 16 or 17, and used for limiting the laser beam directed to the object lens 334.

For example, when a laser beam having a wavelength of 650 nm is generated from the semiconductor laser 350 in the optical system shown in FIGS. 16 and 17, with an optical disk recorded in a high density having a transparent substrate of 0.6 mm thickness as illustrated in FIG. 16 (such as DVD), the aperture 354 is selected so as to project a collective light beam having a 0.6 aperture, which is larger than that of a light beam passing through the aperture 359. As shown in FIG. 16, the laser beam passed through the aperture is collected by the object lens and irradiated on the reflecting layer via the transparent substrate so as to form a smallest beam spot of 0.9 $\mu$m. Then the light reflected by the reflecting layer is detected by the detector 358. At the time, the reflected light of the sub beam is neglected as explained with FIGS. 3 and 5. Data is read out by a so-called one beam method.

On the other hand, with an optical disk having a comparatively thick transparent substrate of 1.2 mm thickness as illustrated in FIG. 17 (such as CD), the aperture 359 is selected so as to project a collective light beam having a 0.36 aperture, which is smaller than that of a light beam passing through the aperture 354. Accordingly, in an optical system shown in FIG. 17, a laser beam to pass through is limited compared with the optical system of FIG. 16, which has selected an aperture 354. The laser beam having the beam diameter narrowed by passing through the aperture 359 is collected by the object lens 334 and irradiated on the reflecting layer via the transparent substrate having a thickness of 1.2 mm so as to form a smallest beam spot of 1.6 $\mu$m. Then the light reflected by the reflecting layer is detected by the detector 358. At the time, the reflected light of the sub beam is also adopted. Data is read out by a so-called three beam method.

If an optical disk having a comparatively large transparent substrate with a thickness of 1.2 mm is reproduced with the optical system shown in FIG. 16 (without changing from the aperture 354), the aberration of the laser beam at the time of passing through the transparent substrate becomes so large that a minute beam spot cannot be formed on the reflecting layer. That is, with a thick transparent substrate of the optical disk 11, since the refractive index of the transparent substrate is larger than the air, in order to maintain the object lens 334 in a focused state, the object lens 334 needs to be distant from the optical disk 11. This means that the focus tolerance error of the object lens 334 becomes smaller, and thus even with minute movement of the object lens 334 or slight decline of the object lens 334, the size of the beam spot drastically changes and halo corresponding to the side lobe generates in the vicinity of the beam spot.

On the other hand, if the aperture 359 having an aperture smaller than that of the aperture 354 is selected, even when information is reproduced from or recorded on an optical disk having a comparatively thick transparent substrate, a laser beam enters to the transparent substrate in a narrow range from the object lens 334 with a small aberration to the laser beam, and thus a minute beam spot can be formed on the reflecting layer. That is, since a light beam with the size limitation is collected by the object lens 334, the focal depth at the focal point becomes large, in other words, the focus tolerance error becomes large. Therefore, even with a minute movement of the object lens 334 or slight decline of the object lens 334, a beam spot on the reflecting layer can be kept as a smallest beam spot comparatively easily without drastically changing the beam spot size or generating halo in the vicinity of the beam spot.

FIGS. 18A and 18B illustrate other configurations for selecting the apertures 354 and 359. FIG. 18A illustrates a configuration of a flat plate 360 with apertures 354, 359 having different numerical apertures aligned along a straight line. By the linear movement of the flat plate 360 as indicated with the arrow, the apertures 354 and 359 are selected. FIG. 18B illustrates a configuration of a segment-like plate 362 with apertures 354, 359 having different numerical apertures arranged along the arc. By the rotation of the segment-like plate 362 by a certain angle as indicated with the arrow, the apertures 354 and 359 are selected. Selection of the apertures 354 and 359 can be made not only by this configuration but other configuration can be applied such as limitation of the aperture with a plurality of movable plates as in a lens shutter of a camera.

In example mentioned above, it is preferable that when an optical disk with a transparent substrate having a 0.6 mm thickness (DVD) is placed in the device, the aperture 354 is selected so as to project a collective light beam having a numerical aperture of 0.6, and when an optical disk with a transparent substrate having a 1.2 mm thickness (CD) is placed in the device, the aperture 359 is selected so as to provide a collective light beam having a numerical aperture of 0.36.

Herein, it is preferable that when an optical disk with a transparent substrate having a thickness of 0.4 to 0.8 mm is placed in the device, the aperture 354 is selected so as to project a collective light beam having a numerical aperture of 0.5 to 0.65, and when an optical disk with a transparent substrate having a thickness of 0.9 to 1.3 mm is placed in the device, the aperture 359 is selected so as to provide a collective light beam having a numerical aperture of 0.3 to 0.5.

As an optical system, not only the above-mentioned configuration but various embodiments can be applied as well.

As means for changing or switching numerical aperture, various embodiments can be applied. For example, a plurality of lenses with mechanical switching can be adopted. Further, a plurality of pick-up units integrally comprising a lens and a light beam generating source, which can be selected and switched can be adopted as well.

Further, a pick-up device may be provided which has one object lense and a plurality of laser beam generating sources having different wavelenghs respectively. And the laser beam generating sources are, selectively, used according to a certain kind of disk.

FIG. 19 illustrates the reproduction device of the present invention. The output of a pick-up 403 capable of changing or switching the reading characteristics according to the kind of the optical disk 401 is inputted to the signal (data) processing system 404. The signal (data) processing system 404 comprises a demodulation circuit for dealing with 8–14 modulation signals (CD), 8–16 modulation signals (DVD) and the like, demodulating the input signal according to the input, and correcting errors. Furthermore, a separation circuit for separating a data stream and a decoder for decoding separated data.

Reproduced signals from the pick-up 403 are used by the servo system 405 as mentioned above. Tracking or focus control signals from the servo system 405 are returned to the pick-up 403. Speed control signals for controlling the rotation of the optical disk 401 are also returned from the servo system 405 to the pick-up motor 402. The system controlling portion 406 can switch characteristics or processing contents of the signal (data) processing system 404 according to the switch of the numerical aperture. It also can switch response characteristics of the servo system 405. Various embodiments of pick-up 403 can be applied, and thus one suitable for the disks or one capable of switching characteristics can be selected. Either a type having a plurality of laser beams as the light source or a type having one laser beam can be used. Either a type having one lens system or a type having a plurality of lens systems capable of switching can be used.

That is, the system is an optical disk reproduction device for reproducing recorded signals from a plurality of disks having different track pitches via an optical pick-up. The device comprises a numerical aperture changing means to change the numerical aperture of a beam outputted from the optical pick-up according to the disk to be reproduced and a signal processing system changing means to change the characteristics of the signal processing system connected to the later stage of the above-mentioned pick-up subsequent to the change of the numerical aperture of the beam by the numerical aperture changing means according to the disk to be reproduced.

Furthermore, the system may comprise a data processing system switching means for switching the characteristics of the data processing system connected to the later stage of the pick-up subsequent to the change of the numerical aperture of the beam by the numerical aperture changing means according to the recording format of the disk to be reproduced. Moreover, the system may comprise a data processing system switching means for switching the characteristics of the data processing system connected to the later stage of the pick-up following the change of the numerical aperture of the beam by the numerical aperture changing means according to the recording format of the disk to be reproduced. The switching means may comprise software provided in the system controlling portion 406 or dedicated hardware.

As mentioned above, according to the invention, signal processing functions can be switched according to the switch of optical systems, and thus a pick-up, reproduction and controlling system suitable for the disk can be provided.

Furthermore, the invention may effectively be applied to a reproduction device for reproducing an optical disk having a plurality of layers. For example, it can effectively be applied to the case of not only judging the disk but also of switching the state of the reproduction device.

For example, some of reproduction devices automatically have a state switching mode when operation input from the outside is applied or the reproduction of one program or one side of a disk is finished. In the state switching mode, for example, a forcible focus adjusting operation is implemented. And a signal recording surface of another layer is searched. In this case, an S-letter level detection means mentioned above is effectively used. The waveform of the S-letter signal reaches a certain level at the time of just focus. Therefore, by providing a controlling program for forcibly driving the focus adjusting mechanism and switching processing characteristics of the signal processing portion whenever a certain value of a detected signal of an S-letter wave-form from the S-letter signal detection means, the signal processing state corresponding to the recording format of the disk to be reproduced can be prepared easily.

Various methods can be used for checking whether the signal processing state is appropriate or not. For example, when the error rate in the error correction circuit for processing reproduced signals is low, judgment can be made that an appropriate signal processing state is obtained. Or the state of the signal processing route can be judged by whether an appropriate level is achieved in the signal processing route.

As an appropriate signal processing state, operation of switching from the MPEG-1 processing state to the MPEG-2 processing state can be presented. That is, in a disk having a plurality of sheets attached to each other, sometimes image compressed data of MPEG-2 are recorded in a first layer and image compressed data of MPEG-1 are recorded in a second layer.

Furthers it is also possible that video information is recorded in one layer and sound information and superimposition information is recorded in the other layer. Accordingly, various kinds of information can be recorded in a combination.

FIGS. 20A to 20D illustrate examples of combined disks 501, 601 having two disks, each 0.6 mm thick, adhered to each other.

In a combined disk 501, a signal of the MPEG-1 standard is recorded in a first layer (or a second layer), and a signal of the MPEG-2 standard is recorded in a second layer (or a first layer). When such a combined disk is reproduced, a reproduction device embodying the present invention provides a function of switching signal processing circuits when a layer of a given signal recording surface is detected. At the initial stage of reproducing the signal recorded on the disk, a judgment is made as to the type of disk is present. The disk distinguishing operation effectively utilizes the function of detecting the layer surface, which is the interface of the layers. The layer surface detecting function will be described later.

After reproducing the signal on the first layer of the disk, a focus control is forcibly implemented in order to proceed to reproduce the signal on the second layer. If a layer surface is detected halfway through of the focus control, the signal processing circuits are automatic switched.

A combined disk 601 has a first layer of DVD and a second layer of CD. That is, a first track having a higher recording density is formed in the first layer. A second track having a lower recording density is formed in the second layer. The first and second tracks have different track pitches.

In the reproduction of the combined disk 601, according to a reproduction device of the present invention, switching of signal processing circuit is conducted as mentioned above. That is, when a signal of a second layer is reproduced just after the reproduction of a signal of a first layer, a focus control is forcibly implemented. If a second layer is detected halfway through the focus control, automatic switching of signal processing circuits is conducted. In this case, a circuit is switched to a signal processing circuit for CD.

Figure 21:
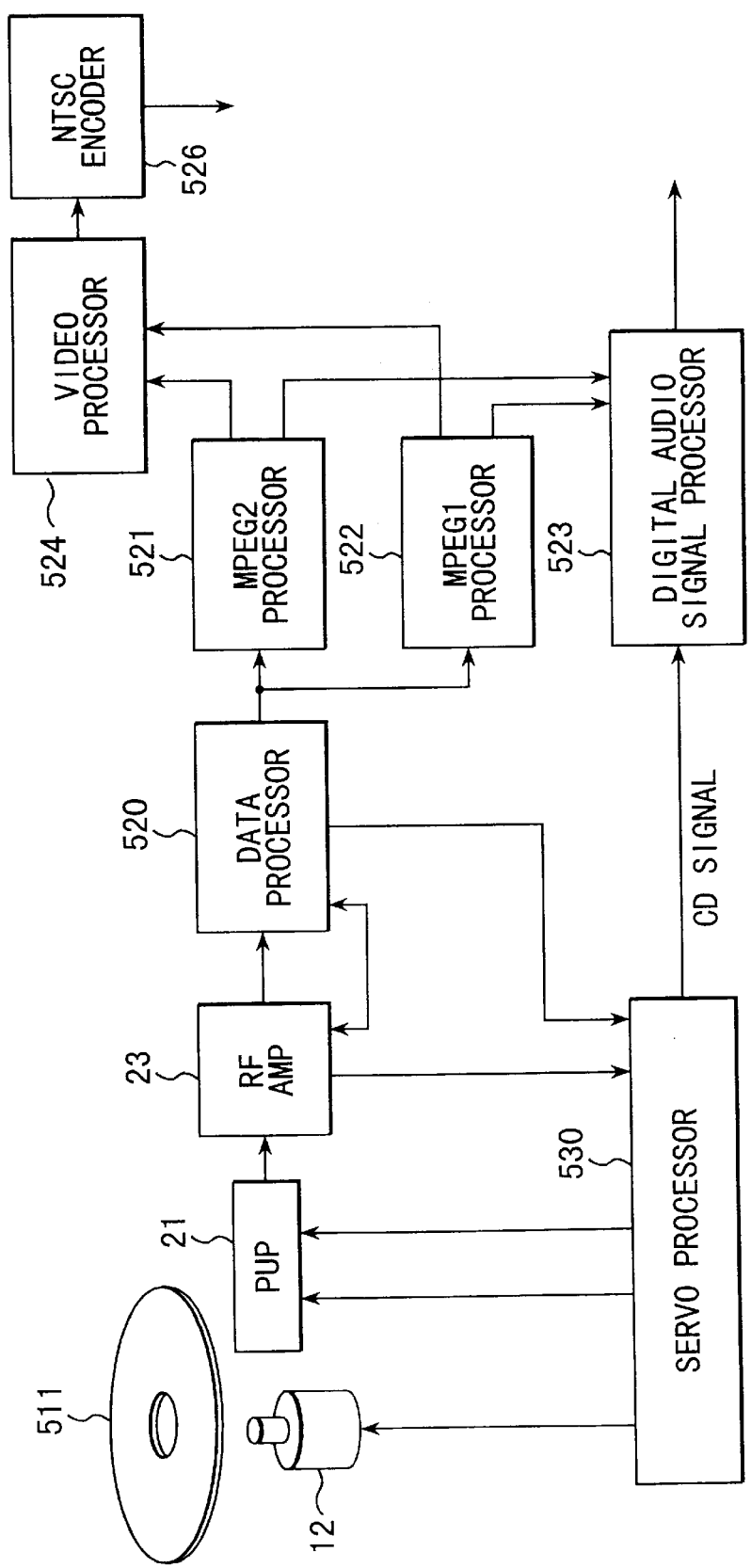
FIG. 21 is a chart illustrating an another example of a block constitution of a reproduction device of the invention.

FIG. 21 shows a configuration of a disk reproduction device of the present invention.

An optical disk 511 is rotated by a disk motor 12. A pick-up device 21 optically reads out the recorded signal of an optical disk 511. An output signal of the pick-up device 21 is amplified with a preamplifier 23. An output of the preamplifier 23 is supplied to a data processor 520 and a servo processor 530. The data processor 520 conducts demodulation processing and error correction processing. Video or audio information processed with the data processor 520 is supplied to an MPEG2 processor 521 and an MPEG1 processor 522. The MPEG2 processor 521 and the MPEG1 processor 522 conduct combination processing of the video information and combination processing of the audio information. The video information combined with the MPEG2 processor 521 and the MPEG1 processor 522 is inputted to a video processor 524. The video processor 524 implements gain control of a video signal, color adjustment to a color signal and image quality adjustment to a luminance signal. The signal from the video processor 524 is supplied to an NTSC encoder 526 and converted to a video signal of an NTSC format.

The audio information combined with the MPEG2 processor 521 and the MPEG1 processor 522 is inputted to a digital audio signal processor 523. The audio signal applied with gain adjustment or separation treatment here is supplied to the next digital analog converter (not illustrated).

The above-mentioned reproduction device can reproduce CD information. Audio information recorded in a CD is separated with a data processor 520 and demodulated with a CD information demodulator in the servo processor 530. The demodulated CD signal is supplied to a digital audio processor 523.

The servo processor 530 generates various kinds of control signals utilizing a high frequency signal from the preamplifier 23. Examples thereof include a focus control signal and a tracking control signal for the pick-up device 21 and a control signal for the disk motor 12.

Figure 20A:
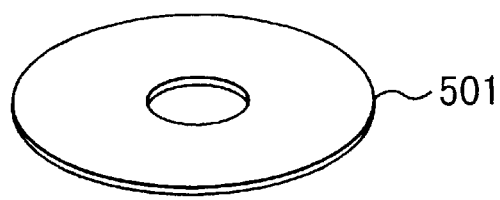
FIG. 20A is a diagram illustrating an example of the disk of the invention.
Figure 20B:
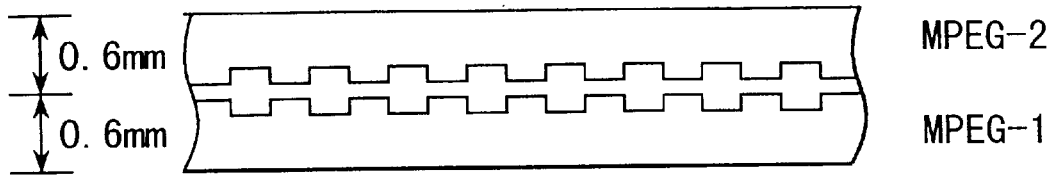
FIG. 20B is a cross-sectional view illustrating the principle of the disk shown in FIG. 20A.
Figure 20C:
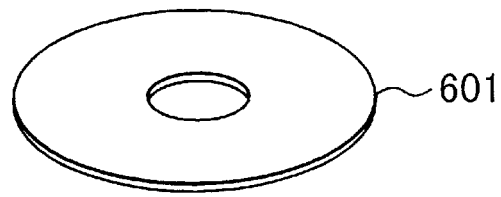
FIG. 20C is a diagram illustrating an example of the disk of the invention.
Figure 20D:
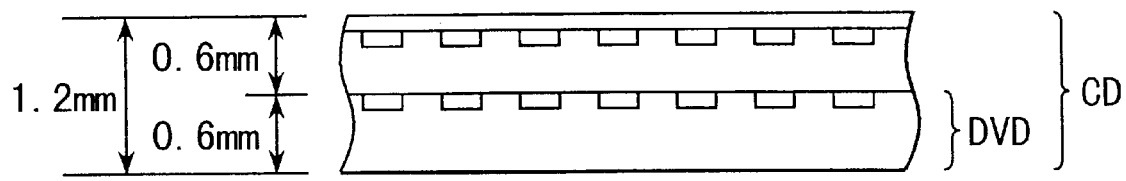
FIG. 20D is a cross-sectional view illustrating the principle of the disk shown in FIG. 20C.

According to the above-mentioned reproduction device, both an optical disk shown in FIGS. 20A and 20B and an optical disk shown in FIGS. 20C and 20D can be reproduced.

In the above-mentioned reproduction device, a disk distinguishing function operates when a disk is inserted. When the disk distinguishing function operates, the focus control portion is forcibly driven. When the focus control portion is forcibly driven, a plurality of S-letter signals can be obtained from the S-letter level detector 26B (see FIG. 11) included in the inside of the data processing portion 520. That is, whenever the focus of a light beam passes on the layer surface of a disk, an S-letter signal is obtained.

Figure 22A:
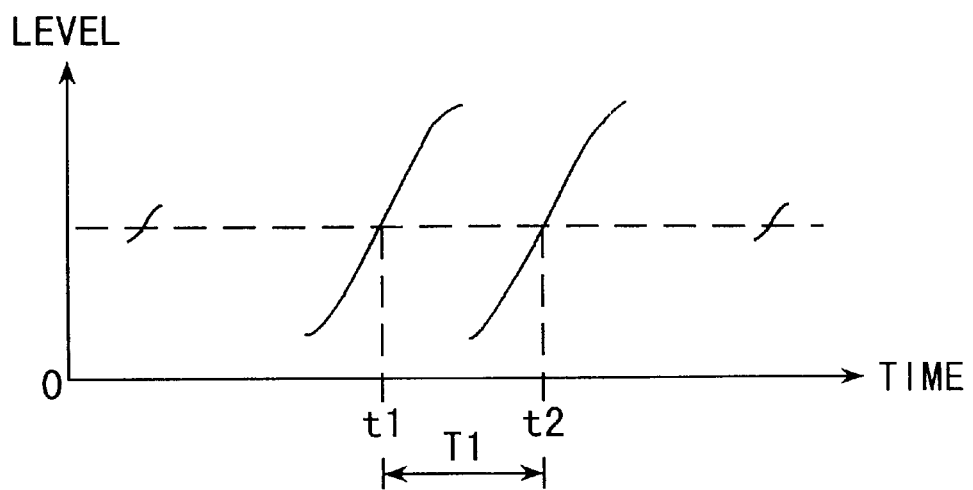
FIG. 22A and FIG. 22B are diagrams illustrating examples of s-letter signals.

FIG. 22A shows an S-letter signal, which can be obtained when a disk 501 of FIG. 20A is mounted on a reproduction device and the focus control portion is forcibly operated. If a lens moves from a position distant from a disk toward the disk, the beam spot passes on two signal recording surfaces. In the disk 501, the two signal recording surfaces are adjacent.

By measuring the time T1 between the point at which the beam spot passes on a first signal recording surface t1 and the point at which the beam spot passes on a second signal recording surface t2, the disk type can be judged.

Figure 22B:
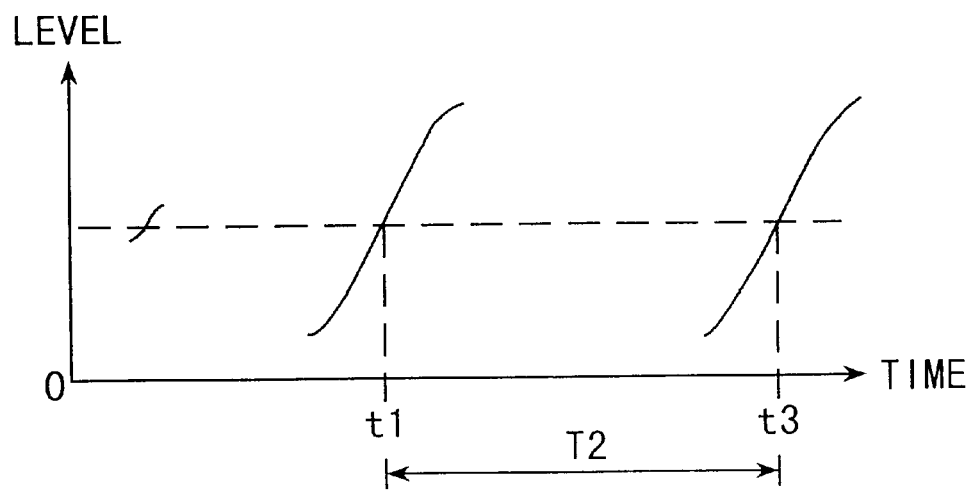

FIG. 22B shows an S-letter signal, which can be obtained when a disk 601 of FIG. 20C is mounted on a reproduction device and the focus control portion is forcibly operated. In this case, the beam spot passes on two signal recording surfaces. In the disk 601, the distance between the two signal recording surfaces is larger than the distance between the two signal recording surfaces in the above-mentioned disk 501.

Accordingly, by measuring the time T2 between the point at which the beam spot passes on a first signal recording surface t1 and the point at which the beam spot passes on a second signal recording surface t3, the disk type can be judged.

The S-letter signal is detected also when a beam spot passes on the surface (not a signal recording surface) of the disk. However, since the level of the S-letter detection signal is low, it is removed with the noise elimination filter 26A (see FIG. 11).

Figure 23:
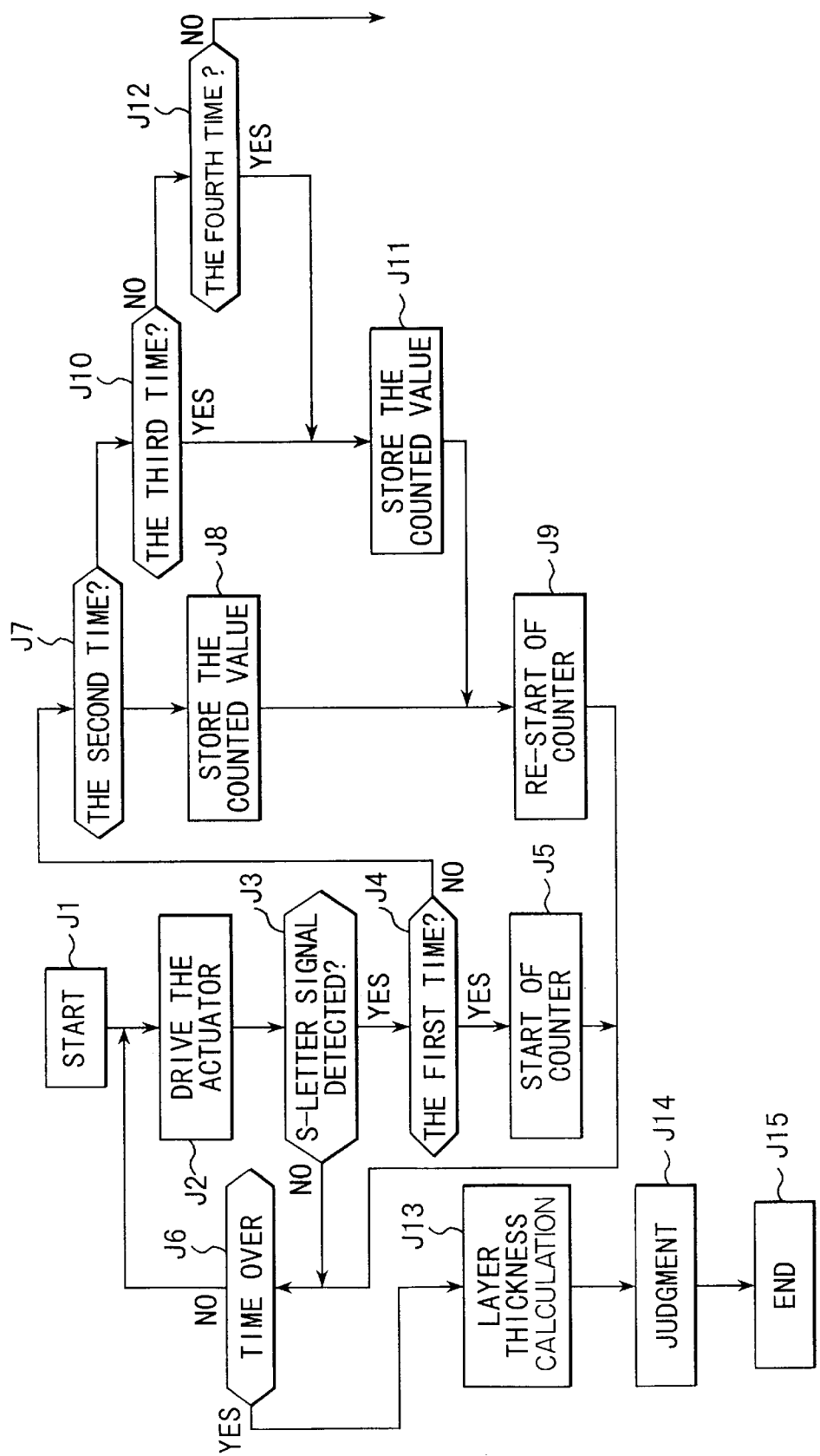
FIG. 23 is a flow chart illustrating an example of the disk distinguishing processing of the reproduction device shown in FIG. 21.

FIG. 23 shows an algorithm of a function to judge the type of disk by detecting the thickness of the disk layer. If a disk is placed in a reproduction device, an actuator of the focus adjustment device is forcibly driven. That is, the focus control is forcibly implemented (steps J1, J2). Judgment is made on whether an S-letter signal is obtained halfway through the focus control (step J3). When an S-letter signal is detected, judgment is made on whether it is the first detection (J4). If it is the first detection, a counting operation of a counter is initiated (step J5). Judgement is then made on whether a predetermined time is over or not from the point at which the focus control is initiated (step J6). If the present point is within the predetermined time, the focus control is continued.

If the time elapses during the judgment process of the steps J2 to J6, the subject disk is determined to have one signal recording surface.

During the focus control, judgment is made on whether an S-letter signal is obtained or not (step J3). If an S-letter signal is detected, judgment is made on whether it is the second detection (J7). If it is the second detection, a first count value of the counter is preserved (step J8). Then the counter is started again (step J9). Judgement is then made on whether the predetermined time is over of not (step J6), and if the present point is within the predetermined time, the focus control is continued. If the predetermined time has elapsed at the present point, the disk kind is judged utilizing the counted value. That is, the distance between the first and second signal recording surfaces are judged based on the counted value. At this point, the above-mentioned disks 501, 601 can be distinguished.

The system is designed also for distinguishing disks having more layers. That is, judgment is made on whether an S-letter signal is obtained or not during the focus control (step J3). If an S-letter signal is detected, judgment is made on whether it is the third detection (J10). If it is the third detection, a second counted value of the counter is preserved (step J11). Then the counter is started again (step J9), and the system returns to the step J2. At this stage, it can be learned that the disk has three signal recording surfaces.

Further, judgment is made on whether an S-letter signal is obtained or not during the focus control (step J3). If an S-letter signal is detected, judgment is made on whether it is the fourth detection (J10). If it is the fourth detection, a third counted value of the counter is preserved (J11). Then the counter is started again (step J9), and the system returns to the step J2.

When an S-letter signal is not detected, whether the time is over or not is always monitored. If the time has elapsed, judgment is made on how many layers the recording surface of the disk has, utilizing the counted value. By the use of the counted value, the thickness of respective disk layers can be judged (steps J13, J14, J15). The thickness information can be used as reference data in conducting focus control with a pick-up device. For example, a beam spot is applied to the data recording surface of a second layer after the reproduction of data in a first layer of a two-layer disk, the above-mentioned thickness information can be used at the focus control portion. That is, at the time of focus adjustment, the thickness information can be used as the control information for driving the actuator. However, in this case, since the moving rate of the actuator varies according to the size of the coil current for driving the actuator, the above-mentioned thickness information can be used with a fine modification. When the coil current for driving the actuator differs between distinguishing a disk and reproducing data, the above-mentioned thickness information is used with a fine modification.

Although a counter starts counting at the point when the first signal recording surface is detected in the above explanation, counting may be initiated at the point when the actuator is started to drive, that is, from the step J2. According to this counting method, a disk of FIG. 1B and a disk of FIG. 1C can be distinguished according to the count number when the first signal recording surface is detected.

FIG. 24A illustrates a CD reproduction device. An optical disk 601 (see FIG. 24B) is rotated and driven by a disk motor 610. Recorded information in the optical disk 601 is read out with a pick-up device 611. A high frequency signal outputted from the pick-up device 611 is amplified with a preamplifier 612. The output from the preamplifier 612 is inputted to a servo processor 618 as well as to a CD interface 613. At the CD interface 613, an 8/14 conversion (EFM) is conducted and a modulated signal is demodulated. The demodulated signal is inputted to an MPEG1 processor 614, providing a decoder. Here demodulation of a video signal and demodulation of an audio signal are conducted. The demodulated video signal is inputted to an NTSC encoder 615, and the demodulated audio signal is inputted to an audio digital analog converter 616.

The above-mentioned CD player is designed such that the focus adjustment range of the pick-up device 611 fits a conventional CD. However, a disk shown in FIG. 20C has a substrate thickness and a signal recording surface compatible to the CD standard. Therefore, the disk shown in FIG. 20C can be mounted in a conventional CD player so as to reproduce a signal recorded in a second layer. That is, a beam from a pick-up of a CD player is designed so as to fit to a disk having a 1.2 mm thickness. Accordingly, the focus of the beam can easily meet the recording surface of the second layer.

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

We claim:

1. An optical disk reproduction device comprising:

a light pick-up device including a plurality of optical systems having different beam spot sizes or different wavelengths;

means for arranging one of the plurality of optical systems to face the optical disk;

means for detecting reflected light from a beam radiated to the disk;

a focus adjusting mechanism and a tracking adjusting mechanism;

signal processing means for switching processing characteristics according to the kind of disk, and for reproducing signals recorded on the disk by using detected signals detected by the detecting means;

focus servo means for switching characteristics according to the kind of disk, for generating focus error signals using the detected signals and providing feedback to the focus adjusting mechanism;

tracking servo means for switching characteristics according to the kind of disk, for generating tracking error signals using the detected signals and providing feedback to the tracking adjusting mechanism;

system controlling means, including an optical setting system, for optionally selecting an optical system suitable for a certain disk from the plurality of optical system;

system setting means for switching processing characteristics and servo characteristics of the signal processing means, focus servo means, and tracking servo means so as to correspond to the certain disk; and means for distinguishing the disk type inserted into the optical reproduction device, said system controlling means comprising means for confirming whether the judged kind of disk is the same as the kind of disk designated by operation input information when the type distinguishing means determines the kind of disk and means for displaying a warning sign when a discrepancy exists.

2. An optical disk reproduction device comprising:

a light pick-up device including a plurality of optical systems having different beam spot sizes or different wavelengths;

means for arranging one of the plurality of optical systems to face the optical disk;

means for detecting reflected light from a beam radiated to the disk;

a focus adjusting mechanism and a tracking adjusting mechanism;

signal processing means for switching processing characteristics according to the kind of disk, and for reproducing signals recorded on the disk by using detected signals detected by the detecting means;

focus servo means for switching characteristics according to the kind of disk, for generating focus error signals using the detected signals and providing feedback to the focus adjusting mechanism;

tracking servo means for switching characteristics according to the kind of disk, for generating tracking error signals using the detected signals and providing feedback to the tracking adjusting mechanism;

system controlling means, including an optical setting system, for optionally selecting an optical system suitable for a certain disk from the plurality of optical system;

system setting means for switching processing characteristics and servo characteristics of the signal processing means, focus servo means, and tracking servo means so as to correspond to the certain disk; and means for distinguishing the disk type inserted into the optical reproduction device, said system controlling means comprising:

means for displaying a warning signal when the error of a reproduced signal in the signal processing means is more than a certain amount; and means for implementing reproduction until the user changes the designation of the kind of disk to have the error smaller than the certain amount with the optical system setting system and a system setting means established reproduction state corresponding to the disk designated by the user on the kind of disk by the designating operation.

3. The optical disk reproduction device according to claim 2, wherein said system controlling means further comprises:

means for self-designating the kind of disk when a disk is inserted into the device; and means for requesting the designation of another kind of disk.

4. An optical disk reproduction device comprising:

light pick-up device including a plurality of optical systems having different beam spot sizes or different wavelengths;

switching means for arranging one of the plurality of optical systems to face the optical disk;

means for detecting a reflected light from a beam radiated to the disk;

a focus adjusting mechanism, and a tracking adjusting mechanism;

signal processing means for switching processing characteristics according to the kind of disk, and for reproducing signals recorded on the disk by using detected signals detected by the detecting means;

focus servo means for switching characteristics according to the kind of disk, for generating focus error signals by using the detected signals and for providing feedback to the focus adjusting mechanism;

tracking servo means for switching characteristics according to the kind of disk, for generating tracking error signals by using the detected signals and for providing feedback to the tracking adjusting mechanism;

optical system setting means for selecting an optional optical system suitable for an optional disk as the optical system to be used among the plurality of optical system according to the designation input information on the kind of disk;

system setting means for switching processing characteristics and servo characteristics of the signal processing portion, the focus servo means and the tracking servo means corresponding to the optional disk when the optical system setting means selects the optional optical system;

disk setting mode switching means for changing the designation of the kind of disk when the error of the reproduced signal at the signal processing portion is more than a certain amount; and means for implementing reproduction operation when the error of the reproduced signal at the signal processing portion is smaller than the certain amount.

5. The optical disk reproduction device according to claim 4, wherein the designation input information of kind of the disk in the optical system setting means is inputted by operation input of a user.

6. The optical disk reproduction device according to claim 4, wherein the designation input information of the kind of the disk in the optical system setting means is provided from means for self-designating the kind of disk when a disk is inserted into the device.

7. The optical disk reproduction device according to claim 4, wherein the disk setting mode switching means for changing the designation of the kind of disk switches the disk setting mode in a predetermined order preliminarily set according to the kind of the disk.

8. The optical disk reproduction device according to claim 4, wherein disk mode switching means for changing the designation of kind of disk switches the disk setting mode according to a predetermined circulating order.

9. The optical disk reproduction device according to claim 4, wherein the disk mode switching means for changing the designation of the kind of disk switches the disk setting mode according to the operation input from a user.

10. The optical disk reproduction device according to any one of claims 1, 4 and 9, wherein said optical disk includes a plurality of layers, an MPEG-1 signal is recorded on a recording surface of one layer, and an MPEG-2 signal is recorded on a recording surface of another layer.

* * * * *